United States Patent
Kawai

(10) Patent No.: US 9,600,271 B2
(45) Date of Patent: Mar. 21, 2017

(54) SYSTEM, METHOD, AND COMPUTER-READABLE MEDIUM

(71) Applicant: FUJITSU LIMITED, Kawasaki-shi, Kanagawa (JP)

(72) Inventor: Tsutomu Kawai, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/942,548

(22) Filed: Nov. 16, 2015

(65) Prior Publication Data
US 2016/0139912 A1   May 19, 2016

(30) Foreign Application Priority Data

Nov. 19, 2014 (JP) .................. 2014-234493

(51) Int. Cl.
*G06F 9/44* (2006.01)
*G06F 9/445* (2006.01)
*G06F 17/30* (2006.01)

(52) U.S. Cl.
CPC .......... *G06F 8/67* (2013.01); *G06F 17/30309* (2013.01); *G06F 17/30557* (2013.01);
(Continued)

(58) Field of Classification Search
CPC ..... G06F 8/61; G06F 8/65; G06F 8/67; G06F 8/68; G06F 8/71
See application file for complete search history.

(56) References Cited

U.S. PATENT DOCUMENTS 5,873,088 A   2/1999 Hayashi et al.
5,881,378 A   3/1999 Hayashi et al.
(Continued)

FOREIGN PATENT DOCUMENTS

| JP | 04-112242 A | 4/1992 |
|---|---|---|
| JP | 2005-266973 A | 9/2005 |
| WO | 2005/086003 A1 | 9/2005 |

OTHER PUBLICATIONS

Shweta et al., "Data Migration in Heterogeneous Databases (ETL)", Feb. 2014, International Journal of Emerging Technology and Advanced Engineering, vol. 4, Issue 2, pp. 223-227; <http://www.ijetae.com/files/Volume4Issue2/IJETAE_0214_35.pdf>.*

(Continued)

*Primary Examiner* — Thuy Dao
*Assistant Examiner* — Ben C Wang
(74) *Attorney, Agent, or Firm* — Oblon, McClelland, Maier & Neustadt, L.L.P.

(57) ABSTRACT

A system includes: processing circuitry and a database which stores target data to be accessed by a plurality of information processing apparatus each of which executes a software program that issues a request to access the target data, the request including version information regarding the software program which issued the request and is being updated from a first version to a second version. The processing circuitry is configured to: update the database by transferring data from a first database relating to the first version to a second database relating to the second version; receive the request from one of the plurality of information processing apparatuses during the updating of the database; and determine a transmission destination of the received request based on the version information included in the received request and a condition of whether or not the target data is transferred from the first database to the second database.

11 Claims, 26 Drawing Sheets

(52) U.S. Cl.
CPC .................. *G06F 8/61* (2013.01); *G06F 8/65* (2013.01); *G06F 8/68* (2013.01); *G06F 8/71* (2013.01)

(56) References Cited

U.S. PATENT DOCUMENTS

| | | | | |
|---|---|---|---|---|
| 8,875,122 | B2* | 10/2014 | Driesen | G06F 8/65 717/168 |
| 9,213,728 | B2* | 12/2015 | Engelko | G06F 17/30309 |
| 2003/0023963 | A1* | 1/2003 | Birkholz | G06F 8/65 717/172 |
| 2007/0078909 | A1 | 4/2007 | Tamatsu | |
| 2009/0235244 | A1* | 9/2009 | Enomori | G06F 8/65 717/170 |
| 2010/0146497 | A1* | 6/2010 | Kogan | G06F 8/65 717/170 |
| 2010/0262958 | A1* | 10/2010 | Clinton | G06F 8/65 717/171 |
| 2012/0174085 | A1* | 7/2012 | Driesen | G06F 8/65 717/168 |
| 2012/0203862 | A1* | 8/2012 | Tayeb | G06F 8/61 709/217 |
| 2013/0238555 | A1* | 9/2013 | Driesen | G06F 17/30578 707/613 |
| 2013/0275553 | A1* | 10/2013 | Shilo | G06F 8/61 709/217 |
| 2014/0059530 | A1* | 2/2014 | Banavalikar | G06F 9/4406 717/170 |
| 2015/0006476 | A1* | 1/2015 | Engelko | G06F 17/303 707/609 |
| 2015/0007159 | A1* | 1/2015 | Gebhard | G06F 8/67 717/171 |
| 2016/0019278 | A1* | 1/2016 | Jadhav | H04L 67/1095 707/624 |
| 2016/0063050 | A1* | 3/2016 | Schoen | G06F 17/303 707/690 |
| 2016/0092526 | A1* | 3/2016 | Kothari | G06F 17/30563 707/602 |
| 2016/0095267 | A1* | 3/2016 | Kitazaki | H05K 9/0024 361/760 |
| 2016/0098443 | A1* | 4/2016 | Specht | G06F 8/67 707/634 |
| 2016/0170977 | A1* | 6/2016 | Engelko | G06F 17/30595 707/609 |
| 2016/0239523 | A1* | 8/2016 | Haferkorn | G06F 17/30297 |

OTHER PUBLICATIONS

Mishima et al., "Madeus: Database Live Migration Middleware under Heavy Workloads for Cloud Environment", Jun. 2015, ACM, pp. 315-329; <http://dl.acm.org/citation.cfm?id=2724578&CFID=864234337&CFTOKEN=20399867>.*

Jeevarani et al., "Improved Consistency Model in Cloud Computing Databases", 2014 IEEE, pp. 1-3; <http://ieeexplore.ieee.org/stamp/stamp.jsp?tp=&arnumber=7238295>.*

* cited by examiner

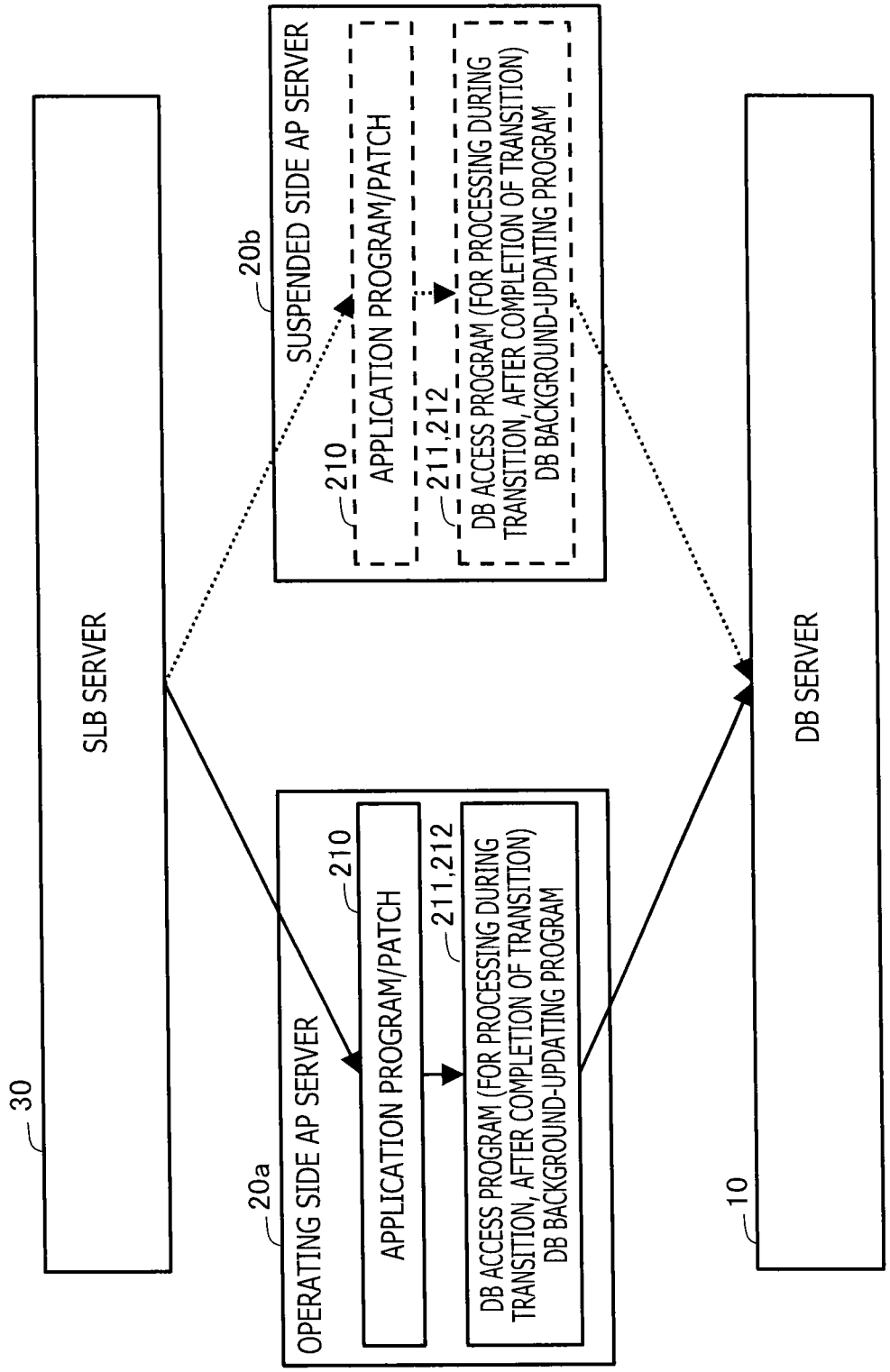

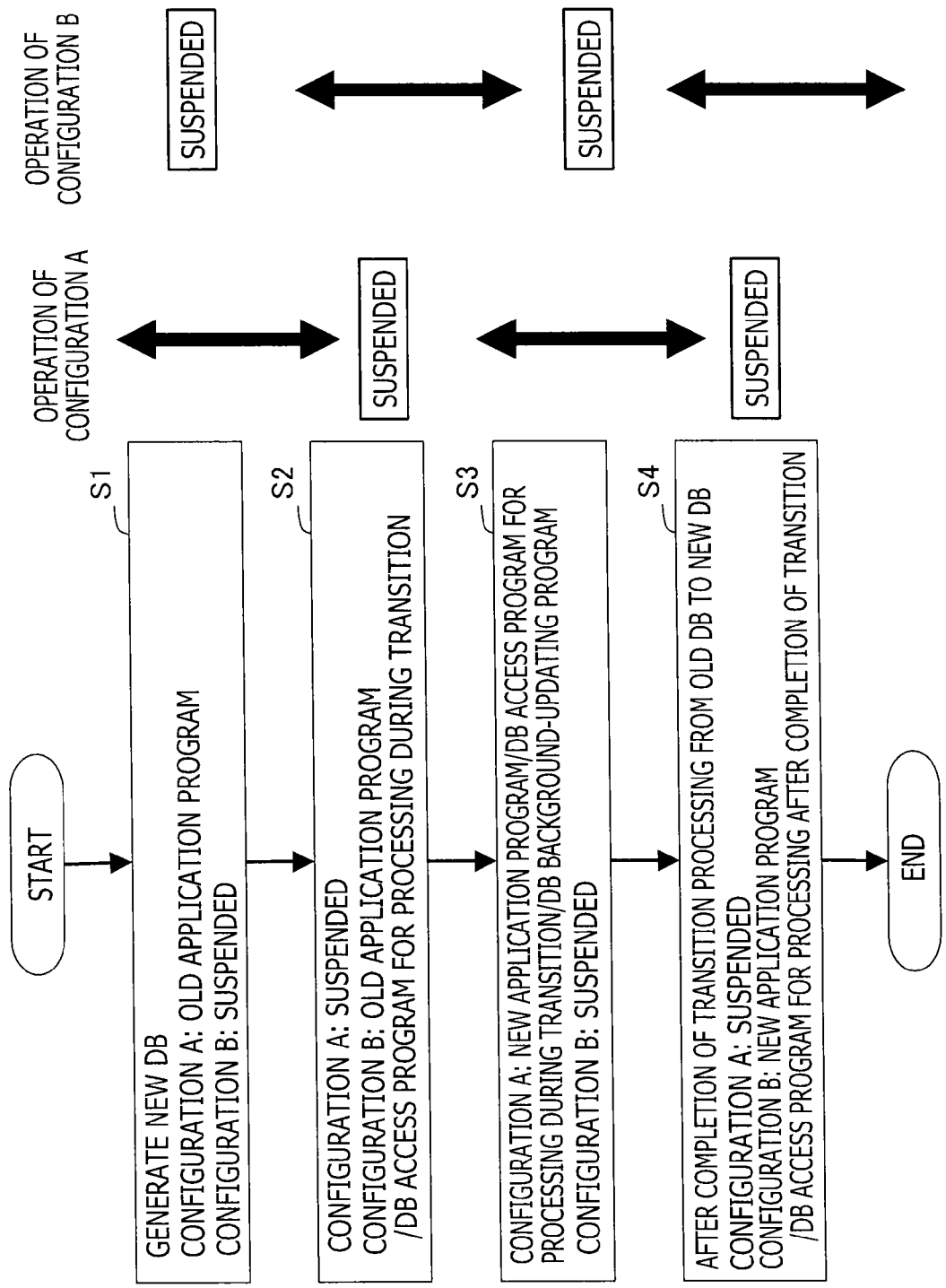

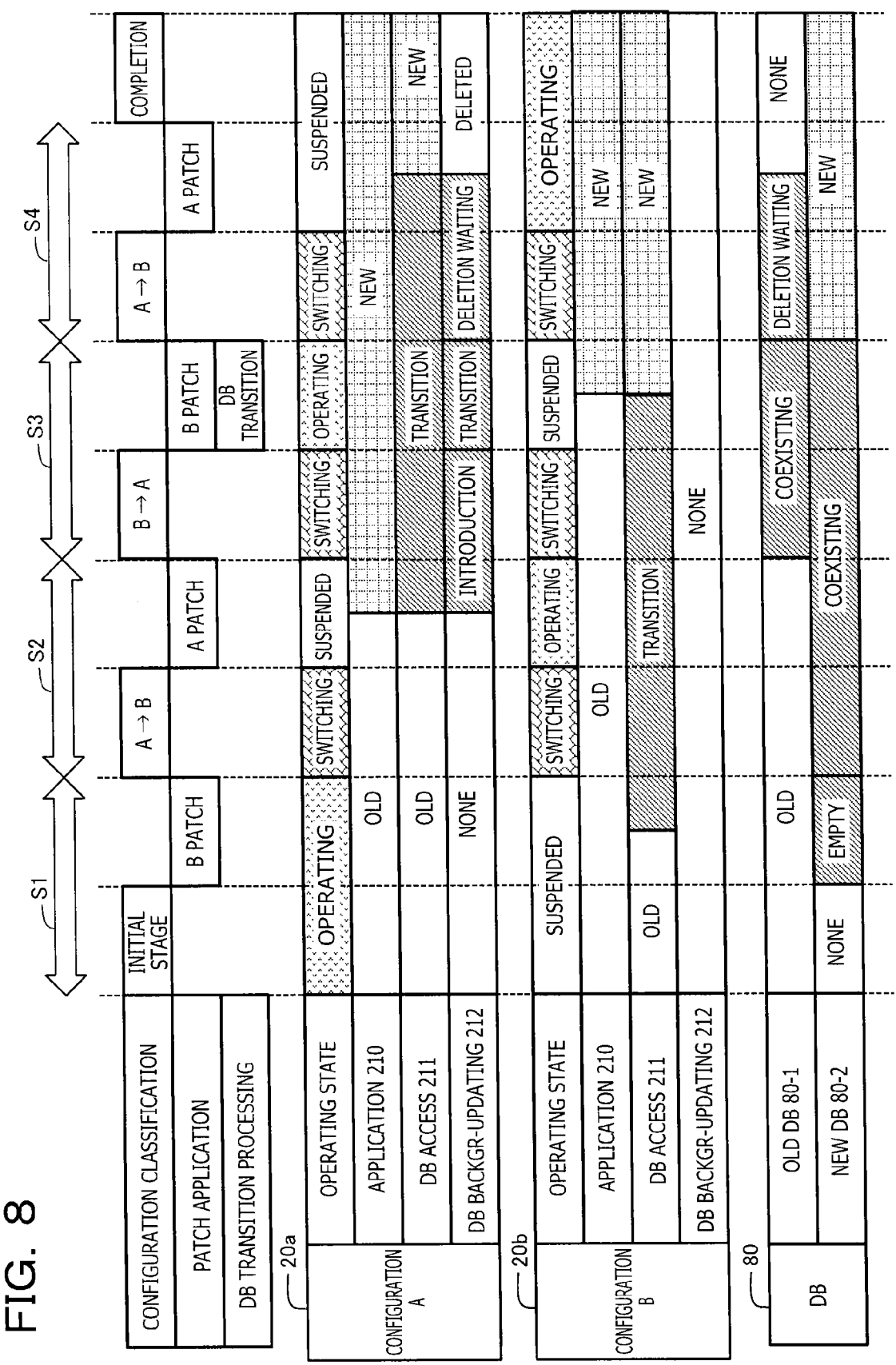

FIG. 9

| 310 | | |
|---|---|---|
| LIST OF APPLICATION PROGRAM CORRECTION FILES | NAMES OF FILES BEFORE UPDATE | NAMES OF FILES AFTER UPDATE |
| LIST OF DB ACCESS PROGRAM (FOR PROCESSING DURING TRANSITION) FILES | NAMES OF FILES BEFORE UPDATE | NAMES OF FILES AFTER UPDATE |
| LIST OF DB ACCESS PROGRAM (FOR PROCESSING AFTER COMPLETION OF TRANSITION) FILES | NAMES OF FILES BEFORE UPDATE | NAMES OF FILES AFTER UPDATE |
| LIST OF DB BACKGROUND-UPDATING PROGRAM FILES | NAMES OF FILES ||

FIG. 11

```
                                                        211-1a
  update(table,version,data(+id)):

NEWtable.lock(TABLE,EXCLUSIVE)
        NEW=raw_where(NEWtable,data.id)
        if (NEW!=NULL) then
cd13 ~  if (version==OLD) then
            NEWtemp=table.convert_to_new(data)
        else                                         ┐
            NEWtemp=data                             ├ cd11
        endif
        raw_update(NEWtable, NEW.line, NEWtemp)
        ret=SUCCESS                                  ┘
        else
         OLD =raw_where(OLD table,data.id)
         if (OLD ==NULL) then
           ret=ERROR
         else
cd14 ~   if (version== OLD) then
             raw_update(OLDtable, OLD.line,data)
           else                                      ├ cd12
             NEWtemp=table.convert_to_new(OLD)
             raw_create(NEWtable, OLD)
             raw_update(NEWtable, NEW.line,data)
           endif
         endif
        endif
        NEWtable.unlock(TABLE,EXCLUSIVE)
        return(ret)
```

FIG. 13

```
                                                            211-1b
    create(table,version,data):

data.id=table.get_id()
cd21 ─── if (version==OLD) then
              NEW=table.convert_to_new(data)
            else
              NEW=data
            endif NEWtable.lock(TABLE,EXCLUSIVE)
            raw_create(NEWtable, NEW)
            NEWtable.unlock(TABLE,EXCLUSIVE)
            return(SUCCESS)
```

```
where(table,version,condition):

NEWtable.lock(TABLE,EXCLUSIVE)
    if (version==NEW) then
        NEWcondition=condition
        OLDcondition=table.conv_to_old(condition)
    else
        NEWcondition=table.conv_to_new(condition)
        OLDcondition=condition
    endif
    NEWret=raw_where(NEWtable, NEWcondition)
    OLDret=raw_where(OLDtable, OLDcondition)
    if (NEWret!=NULL && OLDret!=NULL) then
cd43 ─┐ if (NEWret.id <= OLDret.id) then
            OLDret=NULL
        else
            NEWret=NULL
        endif
    fi
```

211-1d

```
    if (NEWret==NULL && OLDret==NULL) then
        ret=NULL
    else if (OLDret==NULL) then
cd41 ─┐ if (version==NEW) then
            ret=NEWret
        else
            ret=table.conv_to_old(NEWret)
        endif
    else if (NEWret==NULL) then
cd42 ─┐ if (version==NEW) then
            ret=table.conv_to_new(OLDret)
        else
            ret=OLDret
        endif
    endif
    NEWtable.unlock(TABLE,EXCLUSIVE)
    return(ret)
```

```
all(table,version,condition):
    NEWtable.lock(TABLE,EXCLUSIVE)
    if (version==NEW) then
        NEWcondition=condition
        ¥OLDcondition=table.conv_to_old(condition)
    else
        NEWcondition=table.conv_to_new(condition)
        OLDcondition=condition
    endif
    NEWret[]=raw_all(NEWtable, NEWcondition)
    OLDret[]=raw_all(OLDtable, OLDcondition)
cd51 ─> if (version==NEW) then
        ret[]=NEWret[]
        for OLDA in OLDret[] ; do
            if
            (search(NEWret[],id==OLDA.id)==NOTFOUND)
            then
                NEWA=table.conv_to_new(OLDA)
                append(ret[], NEWA)
            endif
        done
```

211-1e

```
    else
        ret[]=NULL
        for NEWA in NEWret[] ; do
            OLDA=table.conv_to_old(NEWA)
            append(ret[], OLDA)
        done
        for OLDA in OLDret[] ; do
            if
            (search(NEWret[],id==OLDA.id)==NOTFOUND)
            then
                append(ret[],OLDA)
            endif
        done
    endif
    NEWtable.unlock(TABLE,EXCLUSIVE)
    return(ret[])
```

FIG. 21

```
destroy(table,version,id):

NEWtable.lock(TABLE,EXCLUSIVE)
    ret=ERROR
    OLD=raw_where(OLDtable,id)
    if (OLD!=NULL) then
      raw_destroy(OLDtable, OLD.line)
      ret=SUCCESS
    endif
    NEW=raw_where(NEWtable,id)
    if (NEW!=NULL) then              ⎫
      raw_destroy(NEWtable, NEW.line) ⎬ cd61
      ret=SUCCESS                    ⎭
    endif
    NEWtable.unlock(TABLE,EXCLUSIVE)
    return(ret)
```
211-1f

FIG. 23

```
lock(TABLE,lockopt):
    raw_lock(NEWtable,lockopt)
```
― 211-1g

```
unlock(TABLE):
    raw_unlock(NEWtable)
```
― 211-1h

```
lock(ROW,id,lockopt):
    NEW=raw_where(NEWtable,data.id)
    if (OLD==NULL) then
      return(ERROR,ENOENT)
    endif
    NEWtable.lock(ROW, NEW.line,lockopt)
```
― 211-1i

```
unlock(ROW,id):
    NEW=raw_where(NEWtable,data.id)
    NEWtable.unlock(ROW, NEW.line)
```
― 211-1j

SYSTEM, METHOD, AND COMPUTER-READABLE MEDIUM

CROSS-REFERENCE TO RELATED APPLICATION

This application is based upon and claims the benefit of priority of the prior Japanese Patent Application No. 2014-234493, filed on Nov. 19, 2014, the entire contents of which are incorporated herein by reference.

FIELD

The embodiment discussed herein is related to a system, a method, and a computer-readable medium.

BACKGROUND

In relation to a cloud service, there is a case in which a plurality of environments are prepared for executing the same application program when a service is provided to a user by the application program (hereinafter, also referred to as software). A processing load is reduced by distributing the processing in accordance with a plurality of application programs.

In a case of applying a patch (correction program) to the plurality of application programs, a method such as rolling update is used. By using the rolling update method, it is possible to apply the patch without suspending the applications.

In addition, each application program stores data to be used in a database (DB). There is a case in which a data configuration in the DB changes. As related art in relation to changes in data configurations, Japanese Patent No. 2503297, Japanese Laid-open Patent Publication No. 2005-266973, and International Publication Pamphlet No. WO2005/086003, for example, are known.

SUMMARY

According to an aspect of the application, a system includes: processing circuitry and a database which stores target data to be accessed by a plurality of information processing apparatus each of which executes a software program that issues a request to access the target data, the request including version information regarding the software program which issued the request and is being updated from a first version to a second version. The processing circuitry may be configured to: update the database by transferring data from a first database relating to the first version to a second database relating to the second version; receive the request from one of the plurality of information processing apparatuses during the updating of the database; and determine a transmission destination of the received request based on the version information included in the received request and a condition of whether or not the target data is transferred from the first database to the second database.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 6 is an explanatory diagram illustrating an outline of processing of applying a patch to two application programs according to the embodiment;

FIG. 7 is an explanatory flowchart of a flow of the processing of applying the patch to the two application programs according to the embodiment;

FIG. 8 is a more specific explanatory diagram of the flow of the processing illustrated in FIG. 7;

FIG. 9 is an explanatory diagram of first management information that is used in the processing of applying the patch as illustrated in FIGS. 6, 7, and 8;

FIG. 11 is a diagram illustrating one type of DB access program illustrated in FIG. 5, which is a DB access program for processing during a transition that responds to an access request indicating data update;

FIG. 13 is a diagram illustrating one type of DB access program illustrated in FIG. 5, which is a DB access program for processing during a transition that responds to an access request indicating new data addition;

FIG. 17 is a diagram illustrating one type of DB access program illustrated in FIG. 5, which is a DB access program for processing during a transition that responds to an access request indicating data condition search (one case);

FIG. 19 is a diagram illustrating one type of DB access program illustrated in FIG. 5, which is a DB access program for processing during a transition that responds to an access request indicating data condition search (all cases);

FIG. 21 is a diagram illustrating one type of DB access program illustrated in FIG. 5, which is a DB access program for processing during a transition that responds to an access request indicating data deletion;

FIG. 23 is a diagram illustrating an exemplary DB access program for describing other processing of the DB access program for processing during the transition illustrated in FIG. 5;

DESCRIPTION OF EMBODIMENTS

There is a case in which a data configuration in a DB that an application program accesses changes due to a patch applied to the application program. In such a case, a plurality of application programs are suspended, and data configurations of data in the DB are changed in order to avoid inconsistencies in the DB.

However, in order to suspend services by the application programs, it is preferable to provide a prior announcement about the service suspension to customers who use the services and to obtain an agreement by the customers. For this reason, it takes significant time and effort to suspend the services by the application programs. Therefore, it is desirable to apply a patch, which accompanies changes in configurations in the database, to the application programs without suspending the services provided by the application programs.

According to an aspect, an object of the embodiment is to update software, which accompanies changes in configurations in a database, without suspending services provided by the software.

Hereinafter, a description will be given of the embodiment with reference to drawings.

Service Providing System

Figure 1:
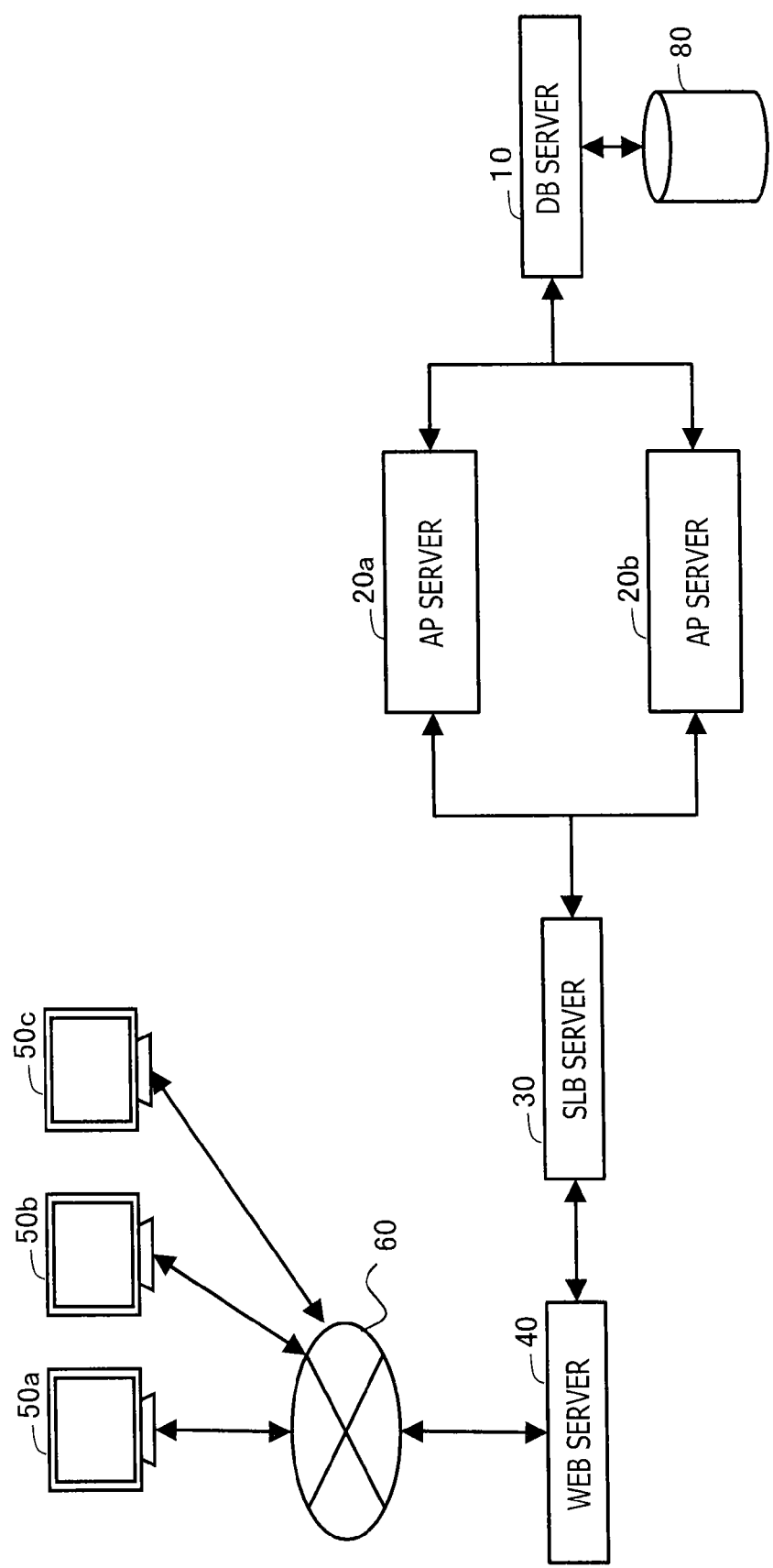
FIG. 1 is a diagram illustrating an exemplary configuration of a service providing system according to an embodiment.

FIG. 1 is a diagram illustrating an exemplary configuration of a service providing system according to the embodiment. The service providing system illustrated in FIG. 1 is a system that provides a cloud service.

The service providing system in FIG. 1 includes a plurality of client devices 50a to 50c, a WEB server 40, a server load balancing (SLB) server 30, a plurality of application servers 20a and 20b, and a database (DB) server 10. The respective servers illustrated in FIG. 1 are physical servers including a CPU and a memory, for example. The client devices 50a to 50c are a personal computer, a mobile terminal, and the like. Hereinafter, the application servers 20a and 20b will be referred to as AP servers 20a and 20b (also referred to as AP servers 20).

Each of the client devices 50a to 50c is coupled to the WEB server 40 via a network 60 such as the Internet. Although an example in which the WEB server 40 is coupled to the three client devices 50a to 50c is illustrated in FIG. 1, the embodiment is not limited to the example.

In addition, the WEB server 40 is coupled to the plurality of AP servers 20a and 20b via the SLB server 30. Each of the plurality of AP servers 20a and 20b is coupled to the DB server 10. The DB server 10 accesses a storage device (hereinafter, referred to as a DB) 80 that stores a database (DB).

The plurality of AP servers 20a and 20b execute the same application programs (software; not illustrated). The SLB server 30 selects the AP server 20a or 20b to which a request from the WEB server 40 is to be allocated in accordance with loaded states of the AP servers 20a and 20b. A large-scaled service providing system that provides a service to many users is provided with the plurality of AP servers 20a and 20b as illustrated in FIG. 1 in order to distribute the load.

In the example illustrated in FIG. 1, the SLB server 30 is a management server, for example. The management server is coupled to a client device (not illustrated) of an operator who manages the service providing system, for example. The operator controls and manages the respective servers by the client device via a management server.

A service that the service providing system in FIG. 1 provides is an infrastructure as a service (IaaS), for example. The IaaS is a service in which a service provider leases physical servers (not illustrated) that are installed in a data center to users (hereinafter, referred to as tenants). The tenants construct desired systems in the leased physical servers as desired and provide predetermined services to users of the tenants.

In the embodiment, the application program is a program for providing the IaaS from a service operator to tenants. The application program provides a function of constructing a physical server, a function of monitoring the physical server, and the like in response to operations performed on a portal site by the tenants, for example. Therefore, according to the embodiment, the database 80 includes a table of data related to setting information of physical servers to be leased to the tenants and a table of data related to setting information for monitoring.

Specifically, the client devices 50a to 50c in the service providing system illustrated in FIG. 1 transmit a hypertext transfer protocol (HTTP) request message for requesting a service to the WEB server 40 in response to an operation input. The WEB server 40 generates a request to the AP servers 20a and 20b and transmits the request to the SLB server 30 in response to the request message from the client devices 50a to 50c.

The SLB server 30 transmits the request to the AP server 20a or 20b that is selected based on load information of the plurality of AP servers 20a and 20b. If the AP server 20a or 20b receives the request, the application program that operates in the AP server 20a or 20b performs processing in accordance with the request. For example, the application program outputs an access request for instructing access to the database 80 to the DB server 10. The DB server 10 performs writing in or reading from the database 80 in response to the access request and outputs an access result to the AP server 20a or 20b.

The AP server 20a or 20b transmits a response to the WEB server 40 or performs other processing based on the result of access to the DB server 10. The WEB server 40 transmits the response that is received from the AP server 20a or 20b via the SLB server 30 to the client devices 50a to 50c as transmission sources of the request. The client devices 50a to 50c receive the response and then display information in accordance with the content of the response.

Update of Software

In the service providing system illustrated in FIG. 1, there is a case in which functions are expanded in order to maintain competitive strength against other companies or meet demands from customers, for example. In addition, there is a case in which the program is corrected due to detection of a security hole or the like. In a case of performing function expansion or correction of the application program that operates in the AP servers 20a and 20b illustrated in FIG. 1, the operator applies a patch to the application program (updates the software).

The patch is data for correcting errors or changing functions by updating a part of the program. In the embodiment, the patch of the application program means addition or change of a part of the program in relation to function expansion or function correction of the IaaS, for example. The patch of the application program is applied to the application program in a suspended state. The operator suspends the application program and applies the patch to the suspended application program by executing a command or a program.

If the application program is suspended, the functions of the IaaS is temporarily not available for the tenants. That is, the processing of monitoring the physical server and the like are temporarily not available for the tenants. This may cause a trouble in the service that the tenants provide to the users of the tenants.

In a case of temporarily suspending the service, the operator obtains agreement about a schedule of the service suspension in advance from the tenants. However, in a case of providing the service providing systems illustrated in FIG. 1 to a plurality of tenants, it is not easy to adjust the schedule of the service suspension that all the tenants can agree with. Moreover, it is inconvenient for the tenants not to receive the service temporarily even if the tenants receive the prior announcement about the temporarily suspension of the application program.

If functions of the provided service are limited during the suspension of the application program and the patch of the application program is applied, the tenants are subject to the temporal restriction of the functions. Therefore, sufficient convenience is not provided.

Therefore, there is a demand for applying the patch to the application program without suspending the service. As a method of applying the patch to the application program without suspending the service, a rolling update method is exemplified. According to the rolling update, an application program of at least one of the plurality of AP servers 20a and 20b is maintained in an executed state, and the patch is sequentially applied to an application program in a suspended state. According to the rolling update, the application program is maintained in the executed state on at least one of the plurality of AP servers 20a and 20b. Therefore, it is possible to apply the patch without suspending the service.

However, there is also a case in which the rolling update method is not applicable depending on the content of the patch. In a case of a patch that accompanies a change in a data configuration in the database 80 (service function expansion and the like), it is difficult to apply the rolling update method. The data configuration includes data definitions such as the number, the sizes, and value types of items in tables provided in the database 80.

In the example illustrated in FIG. 1, the service function expansion is expansion of the IaaS functions to be provided to the tenants. The expansion of the IaaS functions includes, for example, expansion of a function of enabling designation about whether to install a graphics processing unit (GPU) in setting of the physical server to be leased. As described above, the database 80 includes the table of setting information related to the physical server to be leased. Therefore, the table in the database 80 newly includes an item for designating whether to install the GPU in addition to existing items by the application of the patch.

In addition, the rolling update method can be applied to a patch that does not accompany a change in the data configuration in the database 80 (a patch for a security hole or a patch for correcting a function, for example).

Change in Database

Figure 2:
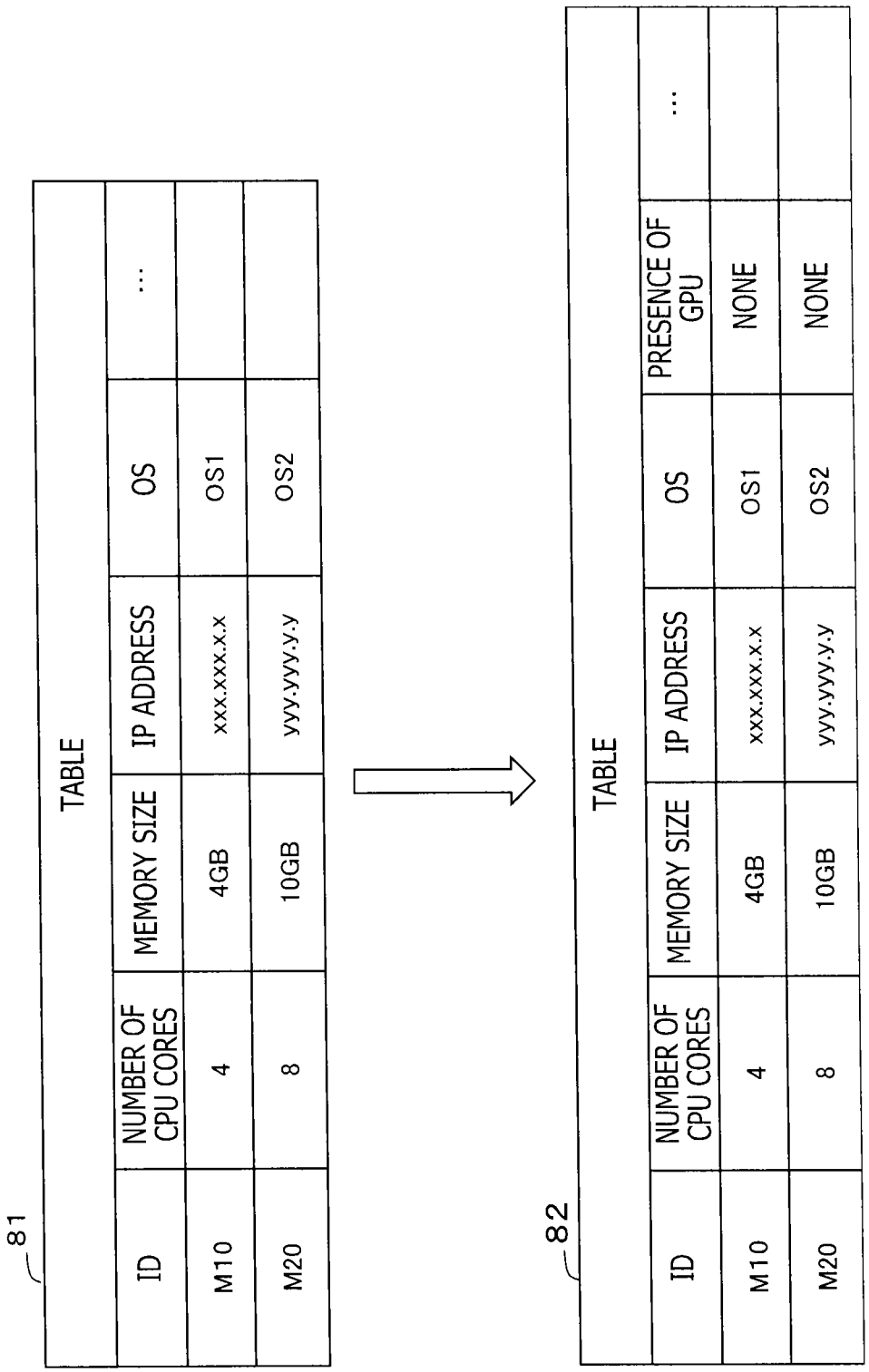
FIG. 2 illustrates an exemplary change in a data configuration in a database (FIG. 1), which accompanies service function expansion.

FIG. 2 illustrates an exemplary change in the data configuration in the database 80 (FIG. 1), which accompanies service function expansion. FIG. 2 illustrates a table 81 that corresponds to a part of tables provided in the database 80 before the function expansion and the same table 82 in the database 80 after the function expansion.

The table 81 in the database 80 before the function expansion includes, for example, an item "identification (ID)", an item "number of central processing unit (CPU) cores", and an item "memory size". In addition, the table 81 further includes, for example, an item "Internet protocol (IP) address" and an item "operation system (OS)".

The item "ID" is information for identifying a physical server. The item "number of CPU cores" represents the number of CPU cores to be installed on the physical server, and the item "memory size" represents the size of a memory to be installed on the physical server. In addition, the item "IP address" represents an IP address to be set for the physical server, and the item "OS" represents a type of an OS to be operated on the physical server.

According to the example of the table 81 in the database 80 before the function expansion illustrated in FIG. 2, a physical server with "ID: M10" is set such that the "number of CPU cores is four", the "memory size is 4 gigabytes (GB)", the "IP address is xxx.xxx.x.x", and the "OS is OS1". Other physical servers also have information of the respective items in the same manner.

In contrast, in the example of the table 82 in the database 80 after the function expansion, an item "presence of GPU" is included in addition to the respective items in the table 81 in the database 80 before the function expansion. As described above, the table 81 and the table 82 have different data configurations. According to the example of the table 82 in the database 80 after the function expansion illustrated in FIG. 2, the item "presence of GPU" in the physical server with the "ID: M10" is set such that "no GPU is to be provided".

The application program accesses data in the database 80 in accordance with the data definitions in the respective tables 81 and 82. That is, an application program to which the patch has not yet been applied accesses the data in accordance with the data configuration in the table 81, and an application program to which the patch has been applied accesses the data in accordance with the data configuration in the table 82. Therefore, the data is not appropriately updated when the application program to which the patch has not yet been applied and the application program to which the patch has been applied updates common data. That is, data inconsistency occurs.

As described above with reference to FIG. 1, the patch is sequentially applied to a plurality of application programs according to the rolling update. Therefore, access from the application program to which the patch has not yet been applied and access from the application program to which the patch has been applied, to the common database 80, occur together until the processing of applying the patch is completed. Therefore, inconsistency occurs in the database 80. When the inconsistency occurs in the database 80, the application programs do not perform processing appropriately.

It is considered that services are temporarily suspended and transition processing of converting the data in the table 81 included in the database 80 to have the data configuration in the table 82 is performed when the patch is applied to a plurality of application programs. However, the database 80 includes a large amount of data in accordance with a scale of the system. Therefore, the transition processing of the database 80 includes a large number of processes in accordance with the amount of the data. Since the transition processing of the database 80 includes a large number of processes, the service is suspended for a long period of time during the transition processing.

Therefore, in the case in which the patch accompanies a change in the data configuration in the database 80, it is not easy to apply the patch to the application programs without suspending the services provided by the application programs.

Next, descriptions will be given of a hardware configuration of the AP servers 20a and 20b according to the embodiment and a software block diagram.

Configuration of AP Server

Figure 3:
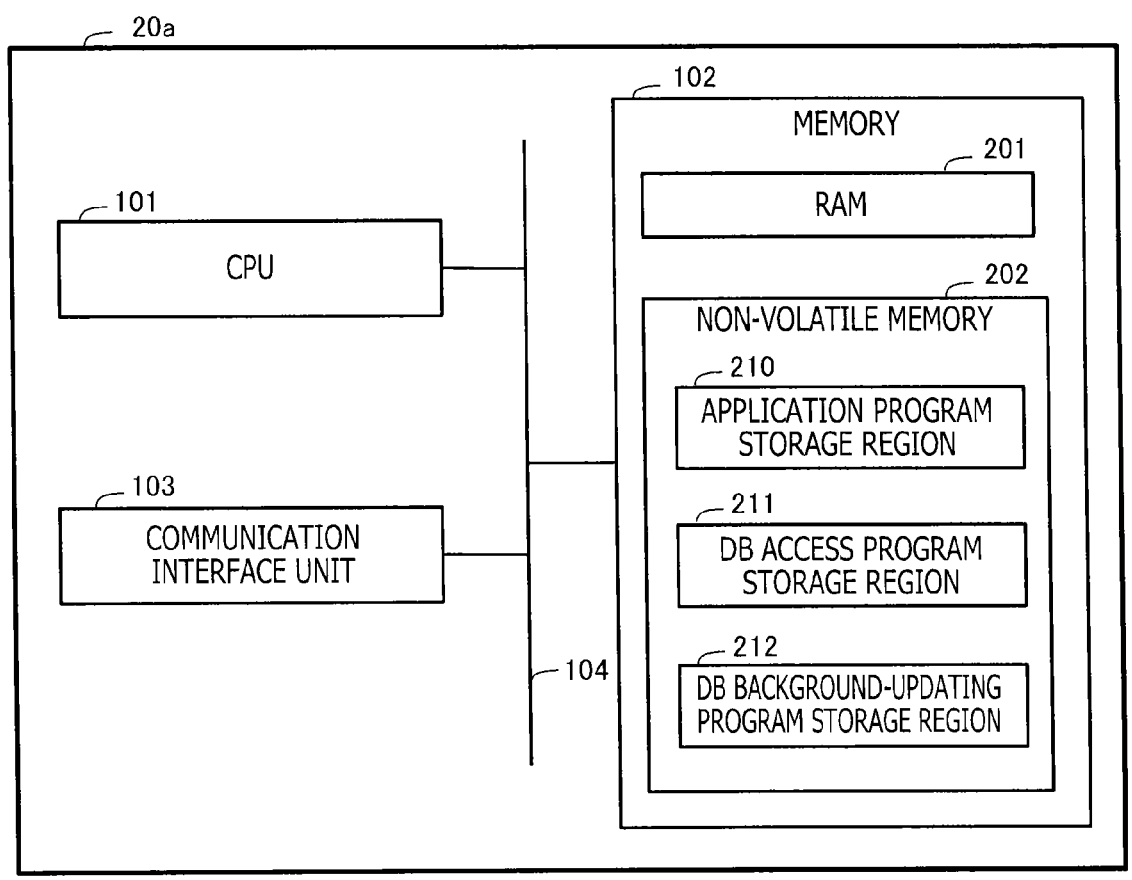
FIG. 3 is an exemplary diagram of a hardware configuration of an AP server illustrated in FIG. 1.

FIG. 3 is an explanatory diagram of a hardware configuration of the AP servers 20a and 20b illustrated in FIG. 1. Although FIG. 3 illustrates a hardware configuration of a single AP server 20a, the other AP server 20b illustrated in FIG. 1 also has the same hardware configuration.

The AP server 20a illustrated in FIG. 3 includes a central processing unit (CPU) 101, a memory 102 including a random access memory (RAM) 201, a non-volatile memory 202, and the like, and a communication interface unit 103. The respective components are coupled to each other via a bus 104.

The CPU 101 is coupled to the memory 102 and the like via the bus 104 and controls the entire AP server 20a. The communication interface unit 103 controls data exchange with communication devices such as the SLB server 30 and the DB server 10 illustrated in FIG. 1 via the intranet. The RAM 201 in the memory 102 stores data and the like on which the CPU 101 performs processing.

The non-volatile memory 202 in the memory 102 includes a region (not illustrated) in which a program of an OS to be executed by the CPU 101 is stored and a storage region 210 in which application programs that operates on the OS are stored. In addition, the non-volatile memory 202 includes a storage region 211 in which a DB access program is stored and a storage region 212 in which a DB background-updating program is stored. The non-volatile memory 202 is configured of a hard disc drive (HDD), a non-volatile semiconductor memory, or the like.

An application program (hereinafter, referred to as an application program 210) in the application program storage region 210 is executed by the CPU 101 and realizes processing of providing the IaaS illustrated in FIG. 1. The application program 210 is a program as a target of a patch application in this embodiment. In addition, the DB background-updating program (hereinafter, referred to as a DB background-updating program 212) in the DB background-updating program storage region 212 is executed by the CPU 101 and realizes the transition processing of the database 80 in a background. Details of the DB background-updating program 212 will be described later with reference to FIG. 5.

In addition, a DB access processing program (hereinafter referred to as a DB access program 211) in the DB access program storage region 211 is executed by the CPU 101 and realizes processing of controlling a request for access to the database 80 by the application program 210. The processing of controlling the access is processing of controlling access to the DB server 10 in accordance with content of an access request that is issued by the application program 210. The access request includes, for example, processing of newly adding data to the database 80 and processing of updating, searching, and deleting data stored in the database 80.

The DB access program 211 calls an application programming interface (API) of DB software (not illustrated) that operates on the DB server 10 (FIG. 1) based on an access request. The DB access program 211 outputs a result of execution of the API as a result of the access request to the application program 210.

Figure 4:
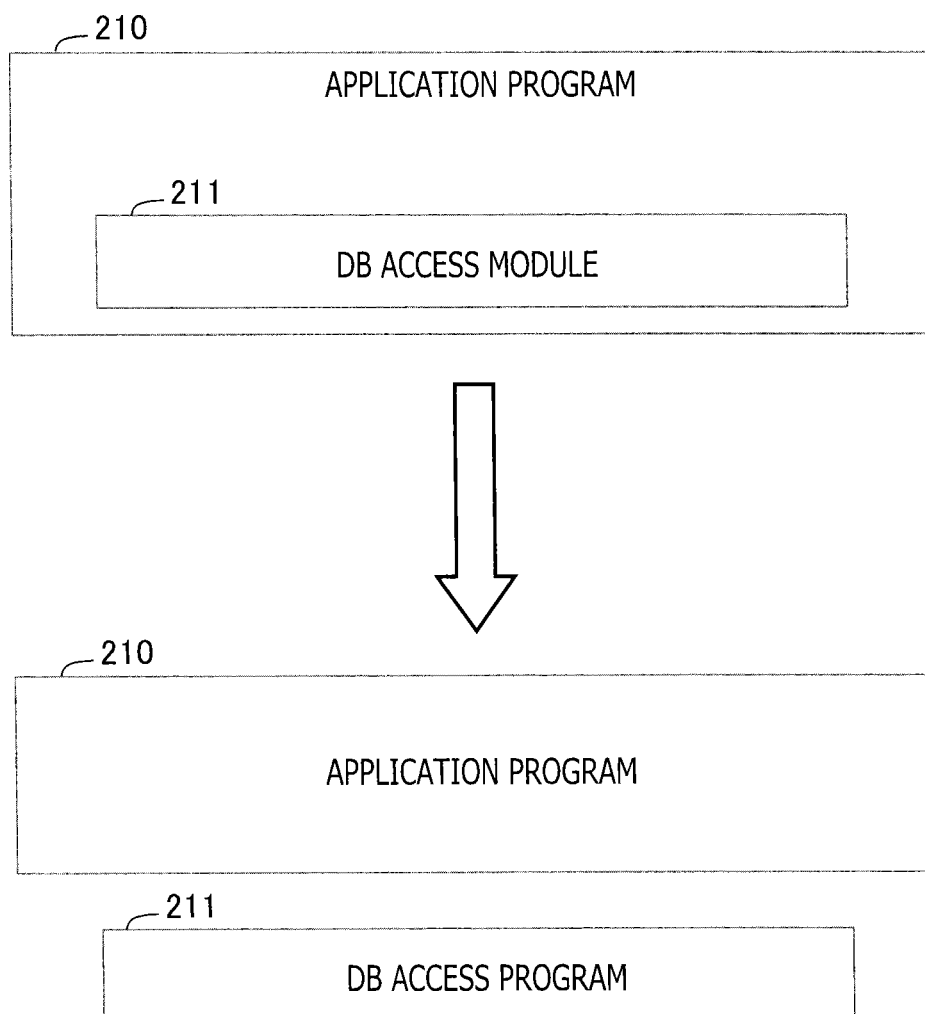
FIG. 4 is an exemplary diagram of a DB access program illustrated in FIG. 3.

FIG. 4 is an explanatory diagram of the DB access program 211 illustrated in FIG. 3. In FIG. 4, the same components as those in FIG. 3 will be represented by the same reference numerals.

FIG. 4 illustrates correspondence between the application program 210 and the DB access program 211. In the embodiment, the patch of the application program 210 further includes the DB access program 211. That is, the DB access program 211 and the patch of the application program 210 occur as a set.

The DB access program 211 is a program corresponding to a DB access module 211 extracted from the application program 210. That is, the DB access module 211 is a module that calls the API of the DB software (not illustrated) that operates on the DB server 10 and outputs the result of the execution of the API based on the access request.

The DB access program 211 performs processing of controlling the access request in accordance with a patch application state of the application program 210. Details of the DB access program 211 will be described later with reference to FIG. 5.

Figure 5:
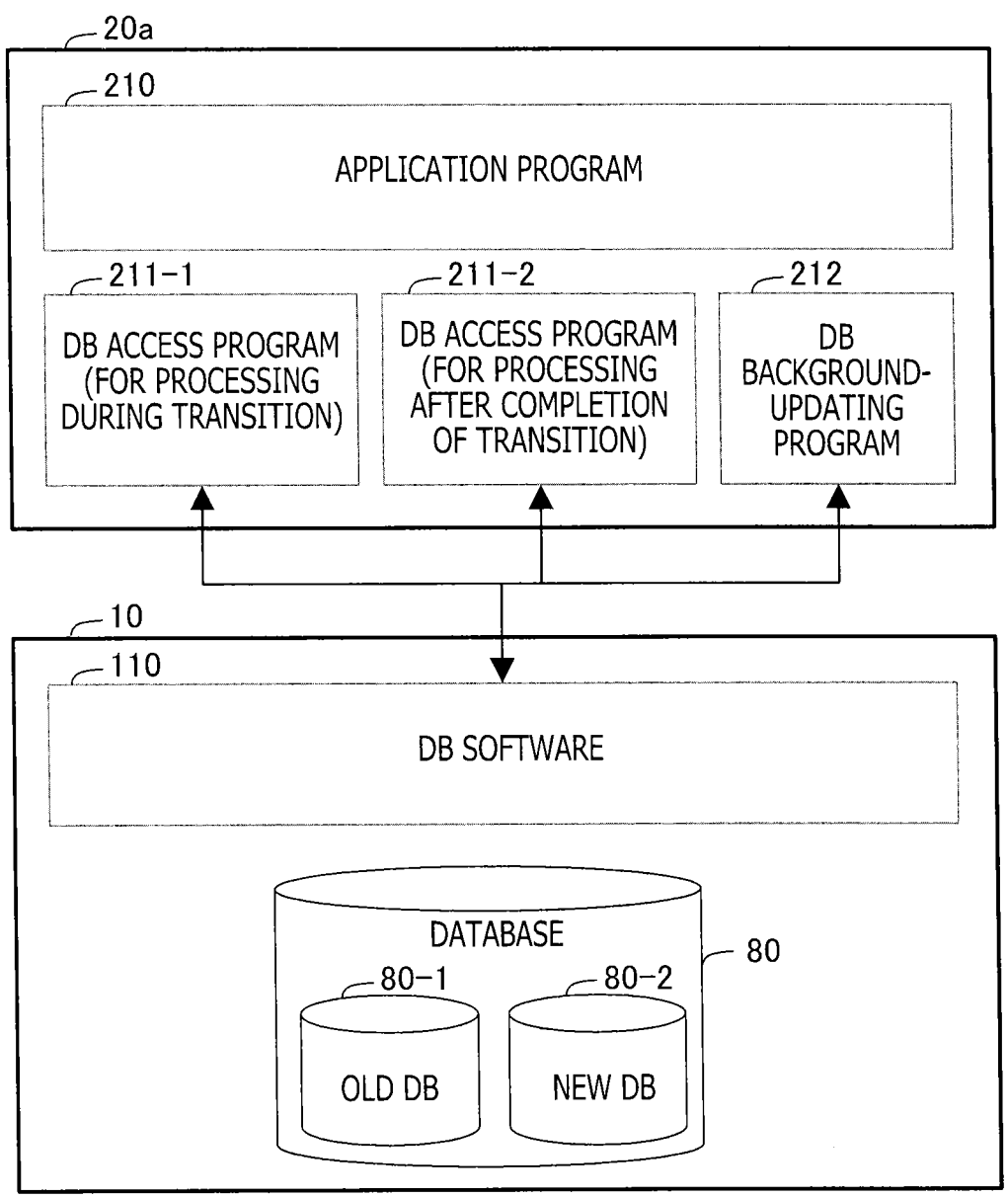
FIG. 5 is a software block diagram of the AP server illustrated in FIG. 3.

FIG. 5 is a software block diagram of the AP server 20a illustrated in FIG. 3. In FIG. 5, the same components as those in FIGS. 1 and 3 will be represented by the same reference numerals. Although FIG. 5 illustrates a software block of a single AP server 20a, the other AP server 20b illustrated in FIG. 1 also has the same software block.

FIG. 5 illustrates a software block diagram of the AP server 20a (FIG. 3) and a software block diagram of the DB server (FIG. 1) 10. As illustrated in FIG. 5, the AP server 20a includes the application program 210, a DB access program 211-1 for processing during a transition, a DB access program 211-2 for processing after completion of the transition, and the DB background-updating program 212. That is, the DB access program 211 illustrated in FIGS. 3 and 4 includes the DB access program 211-1 for processing during the transition and the DB access program 211-2 for processing after completion of the transition.

The application program 210 illustrated in FIG. 5 is either the application program 210 before an application of the patch (not-applied) or the application program 210 after the application of the patch (applied). In this embodiment, the application program 210 to which the patch has not yet been applied is referred to as an application program 210 of an old version. In addition, the application program 210 after the application of the patch will be referred to as an application program 210 of a new version.

In addition, the AP server 20a includes a part or the entirety of the DB access program 211-1 for processing during the transition, the DB access program 211-2 for processing after completion of the transition, and the DB background-updating program 212 in accordance with an application state of the patch to the application program 210. The operator stores the DB access program 211-1 for processing during the transition, the DB access program 211-2 for processing after completion of the transition, and the DB background-updating program 212 in the non-volatile memory 202 (FIG. 3) in accordance with the patch application state of the application program 210, for example.

In addition, the DB server 10 illustrated in FIG. 5 includes the DB software 110 for managing access to the database 80 and the database 80. The DB software 110 is software that performs processing of accessing the database 80 in accordance with the API.

In the embodiment, the database 80 includes an old database 80-1 and a new database 80-2 in accordance with the patch application state of the application program 210. The old database 80-1 is a database corresponding to the application program 210 to which the patch has not yet been applied. In addition, the new database 80-2 is a database corresponding to the application program 210 after the application of the patch. That is, the old database 80-1 includes the table 81 described above with reference to FIG. 2, and the new database 80-2 includes the table 82, for example.

The DB access program 211-1 for processing during the transition is a program for performing the processing of controlling the access until the transition processing from the old database 80-1 to the new database 80-2 is completed. Until the transition processing is completed, both access requests by the application programs 210 of the old and new versions are present, and data as targets of access are present in the old database 80-1 and new database 80-2. The DB access program 211-1 for processing during the transition determines (selects) one of the databases 80-1 and 80-2 to which an access request is to be transmitted in response to the access request and calls the API of the DB software 110 that is intended for the determined database 80-1 or 80-2. Details of the processing performed by the DB access program 211-1 for processing during the transition will be described later with reference to FIGS. 6 and 11 to 23.

The DB access program 211-2 for processing after completion of the transition is a program for performing the processing of controlling access after the transition processing from the old database 80-1 to the new database 80-2 is completed. After completion of the transition, only an access request by the application program 210 of the new version occurs. That is, the DB access program 211-2 for processing after completion of the transition performs an access request to the new database 80-2 in response to an access request by the application program 210 of the new version.

The DB background-updating program 212 is a program performing the transition processing of the respective data items from the old database 80-1 to the new database 80-2 (hereinafter, referred to as transition processing) in the background. The DB background-updating program 212 converts data that is included in the old database 80-1 and is not included in the new database 80-2 based on a data configuration in the new database 80-2 and sequentially adds the data to the new database 80-2. Details of the processing performed by the DB background-updating program 212 will be described later with reference to FIGS. 24 and 25.

Next, a description will be given of a flow of processing of applying the patch to two application programs 210 according to the embodiment with reference to FIGS. 6 to 8.

Flow of Processing of Applying Patch

FIG. 6 is an explanatory diagram of an outline of processing of applying the patch to the two application programs 210 according to the embodiment. In FIG. 6, the same components as those in FIGS. 1 and 5 will be represented by the same reference numerals. The two application programs 210 are application programs that operate on the AP servers 20a and 20b illustrated in FIG. 1. As described above with reference to FIG. 1, the AP servers 20a and 20b are coupled to the SLB server 30 and access the common database 80 via the DB server 10.

In the processing of applying the patch according to the embodiment, the patch is sequentially applied to the two application programs 210 illustrated in FIG. 6 in the same manner as the rolling update illustrated in FIG. 1. That is, the operator operates one AP server 20a and suspends the other AP server 20b in the process of the processing of applying the patch. Then, the operator applies the patch to the application program 210 on the AP server 20b on the suspended side.

Therefore, the one AP server 20a is an AP server 20a on the operating side, and the other AP server 20b is an AP server on the suspended side as illustrated in FIG. 6 in the process of the processing of applying the patch. In such a case, the SLB server 30 transmits a request to the AP server 20a on the operating side (the arrow of the solid line in FIG. 6). That is, the SLB server 30 does not transmit a request to the AP server 20b on the suspended side (the arrow of the dotted line in FIG. 6). As described above with reference to FIG. 5, the respective AP servers 20a and 20b includes the DB access program 211-1 for processing during the transition, the DB access program 211-2 for processing after completion of the transition, and the DB background-updating program 212.

In addition, the application program 210 illustrated in FIG. 6 is either the application program 210 to which the patch has not yet been applied or the application program 210 to which the patch has been applied (illustrated as a patch in FIG. 6) in accordance with the patch application state. Therefore, both an access request by the application program 210 of the old version and an access request by the application program 210 of the new version occur in the processing of applying the patch.

Although not illustrated in FIG. 6, the DB background-updating program 212 sequentially performs the transition processing in the background in the processing of applying the patch according to the embodiment. Therefore data items as targets of the access requests are present in the old and new databases 80-1 and 80-2 in the processing of applying the patch.

Therefore, the DB access program 211-1 for processing during the transition illustrated in FIG. 5 is operated in the AP server 20a or 20b during the transition processing in the processing of applying the patch according to the embodiment. The DB access program 211-1 for processing during the transition determines one of databases 80-1 and 80-2, to which an access request is to be transmitted, based on information related to a version of the application program 210 included in the access request and information related to a data transition state. Then, the DB access program 211-1 for processing during the transition calls the API of the DB software 110 that is intended for the determined database 80-1 or 80-2.

The information related to a version of the application program 210 is information indicating whether or not the application program 210 has been updated, that is, information indicating whether or not the patch has been applied. In addition, the information related to the data transition state is information indicating the transition state from the old database 80-1 to the new database 80-2 and indicating whether or not target data has been added to the new database 80-2.

In doing so, the DB access program 211-1 for processing during the transition can transmit the access request to an appropriate database 80-1 or 80-2. That is, the DB access program 211-1 for processing during the transition realizes compatibility of the access request in a case in which access requests by the application programs 210 of a plurality of versions are present together and the data items as targets of the access requests are present in the plurality of databases 80-1 and 80-2.

In doing so, it is possible to execute the access request while maintaining consistency of the data items in the databases 80-1 and 80-2 even in the course of the processing of applying the patch. Therefore, it is possible to provide the service by the application program 210 even in the course of the processing of applying the patch. According to the embodiment, it is possible to perform the transition processing of the database 80 in the course of the processing of applying the patch to the application program 210 by the DB background-updating program 212 performing the transition processing in the background.

FIG. 7 is an explanatory flowchart of a flow of the processing of applying the patch to the application programs 210 according to the embodiment. In the flowchart illustrated in FIG. 7, the AP server with a configuration A is the AP server 20a illustrated in FIGS. 1 and 6. In addition, the AP server with a configuration B is the AP server 20b illustrated in FIGS. 1 and 6.

S1: It is assumed that only the AP server 20a with the configuration A is operating in an initial state in the embodiment. On the AP server 20a with the configuration A, the application program 210 of the old version operates. The operator generates a new empty database 80-2 based on a data definition (data configuration) in the application program 210 after the application of the patch. The empty database is a database, which does not store data, to which only the data definition is applied. In addition, the operator may prepare a program for transition and may generate the new empty database 80-2 based on the program for transition, for example.

S2: Next, the operator switches the AP server on the operating side from the AP server 20a with the configuration A to the AP server 20b with the configuration B. During the switching, both the AP servers 20a and 20b with the configurations A and B are temporarily in an executed state. After completion of the switching, the application program 210 of the old version and the DB access program 211-1 for processing during the transition operate on the AP server 20b with the configuration B.

In addition, the operator applies the patch to the application program 210 of the old version on the AP server 20a with the configuration A that is being suspended. In doing so, the application program 210 on the AP server 20a with the configuration A is updated to the new version. In addition, the operator introduces the DB access program 211-1 for the processing during the transition and the DB background-updating program 212 to the AP server 20a with the configuration A.

S3: Next, the operator switches the AP server on the operating side from the AP server 20b with the configuration B to the AP server 20a with the configuration A. During the switching, both the AP servers 20a and 20b with the configurations A and B are temporarily in the executed state. After completion of the switching, the application program 210 of the new version, the DB access program 211-1 for processing during the transition, and the DB background-updating program 212 operate on the AP server 20a with the configuration A.

In addition, the operator applies the patch to the application program 210 on the AP server 20b with the configuration B that is being suspended. In doing so, the application program 210 on the AP server 20b with the configuration is updated to the new version. In addition, the operator updates the DB access program 211-1 for processing during the transition on the AP server 20b with the configuration B to the DB access program 211-2 for processing after completion of the transition.

S4: If the data transition processing by the DB background-updating program 212 is completed, the operator switches the AP server on the operating side from the AP server 20a with the configuration A to the AP server 20b with the configuration B. During the switching, both the AP servers 20a and 20b with the configurations A and B are temporarily in the executed state. After completion of the switching, the application program 210 of the new version and the DB access program 211-2 for processing after completion of the transition operate on the AP server 20b with the configuration B. In addition, the operator updates the DB access program 211-1 for processing during the transition on the AP server 20a with the configuration A, which is being suspended, to the DB access program 211-2 for processing after completion of the transition.

In doing so, the updating of the application programs 210 on the AP servers 20a and 20b with the configurations A and B to the new version is completed, and the data transition processing is completed. In addition, the DB access program 211-1 for processing during the transition on the AP servers 20a and 20b with the configurations A and B is updated to the DB access program 211-2 for processing after completion of the transition.

Next, a more specific description will be given of the processing, which was described above with reference to the flowchart in FIG. 7, with reference to FIG. 8.

FIG. 8 is a more specific explanatory diagram of the flow of the processing described above with reference to FIG. 7. Steps S1 to S4 in FIG. 8 correspond to Steps S1 to S4 in the flowchart illustrated in FIG. 7. In FIG. 8, the same components as those in FIG. 5 will be represented by the same reference numerals.

S1: As illustrated in FIG. 7, the AP server 20a with the configuration A is operating (operating in FIG. 8; this will be omitted in the following description) and the AP server 20b with the configuration B is being suspended (suspended in FIG. 8; this will be omitted in the following description) in the initial state of the processing of applying the patch according to the embodiment. In addition, the application program 210 on the AP servers 20a and 20b with the configurations A and B is the application program 210 ("OLD" in FIG. 8) of the old version. In Step S1, the DB access program 211-1 for processing during the transition is introduced to the AP server 20b with the configuration B ("PATCH" in FIG. 8) and generates the new empty database 80-2 in accordance with management information. The management information will be described later with reference to FIGS. 9 and 10.

S2: In Step S2, the AP server 20b with the configuration B is activated, and both the AP servers 20a and 20b with the configurations A and B are brought into the operating state ("A→B" in FIG. 8). That is, the AP servers 20a and 20b with the configurations A and B shift to a switching state (switching in FIG. 8; this will be omitted in the following description). As described above with reference to FIG. 7, the DB access program 211-1 for processing during the transition ("TRANSITION" in FIG. 8) operates in addition to the application program 210 of the old version on the AP server 20b with the configuration B at this time.

In Step S2, the operator suspends the AP server 20a with the configuration A after the switching state. Then, the operator applies a patch to the application program 210 on the AP server 20a with the configuration A in accordance with the management information ("A patch" in FIG. 8). In addition, the operator introduces the DB access program 211-1 for processing during the transition and the DB background-updating program 212 to the AP server 20a with the configuration A.

In Step S2, the application program 210 ("OLD" in FIG. 8) of the old version operates on both the AP servers 20a and 20b with the configurations A and B. However, the DB access program 211-1 transmits an access request to the new database 80-2 in response to the access request by the application program 210 of the old version in some cases. The cases include a case of receiving an access request indicating new data addition, for example. In doing so, new data is added to the new database 80-2. Therefore, the new database 80-2 is brought into a coexisting state ("COEXISTING" in FIG. 8). Details of the DB access program 211-1 in the case of receiving the access request indicating new data addition will be described later with reference to FIGS. 13 and 14.

S3: In Step S3, the AP server 20a with the configuration A is activated, and both the AP servers 20a and 20b with the configurations A and B are brought into the operating state ("B→A" in FIG. 8). That is, the AP servers 20a and 20b with the configurations A and B are brought into the switching state.

During the switching state, the DB access program 211-1 for processing during the transition ("TRANSITION" in FIG. 8) and the DB background-updating program 212 ("TRANSITION" in FIG. 8) operate in addition to the application program 210 ("NEW" in FIG. 8) of the new version on the AP server 20a with the configuration A. In addition, the application program 210 of the old version and the DB access program 211-1 for processing during the transition operate on the AP server 20b with the configuration B in the same manner as in Step S2.

In Step S3, the operator suspends the AP server 20b with the configuration B after the switching state. Then, the operator applies a patch to the application program 210 on the AP server 20b with the configuration B in accordance with the management information ("B PATCH" in FIG. 8). In addition, the operator updates the DB access program 211-1 for the processing during the transition with the configuration B to the DB access program 211-2 for the processing after completion of the transition. Moreover, the DB background-updating program 212 sequentially adds data that is present in the old database 80-1 to the new database 80-2 in the background ("DB TRANSITION" in FIG. 8). In doing so, the old database 80-1 is brought into the coexisting state ("COEXISTING" in FIG. 8).

The process in Step S3 is continued until the transition processing by the DB background-updating program 212 is completed. The state where the transition processing has been completed means a state in which the number of data items that is not present in the new database 80-2 while being present in the old database 80-1 becomes zero. The operator determines a progress of the transition processing in accordance with a progress management table of the management information which will be described later with reference to FIG. 10, for example. In a case of a large-scaled service providing system, it takes a period in units of months for the process in Step S3 in some cases. Details of the processing by the DB background-updating program 212 will be described later with reference to FIGS. 24 and 25.

There is a case in which the DB access program 211-1 makes transition of data as a target of access to the new database 80-2 depending on an access request. For example, the DB access program 211-1 makes transition of data as a target of update in the old database 80-1 to the new database 80-2 in response to an access request indicating data update by the application program 210 of the new version. Details of the DB access program 211-1 in the case of receiving the access request indicating data update will be described later with reference to FIGS. 11 and 12.

In contrast, transition of data that is not a target of update to the new database 80-2 is not made. Therefore, it is possible to make transition of all data items included in the old database 80-1 to the new database 80-2 in parallel with the processing of applying the patch by the DB background-updating program 212 performing the transition processing.

On the AP server 20a with the configuration A, the application program 210 of the old version operates in Steps S1 and S2 while the application program 210 updated to the new version operates in Step S3. During the switching state in Step S3, the application program 210 of the new version operates on the AP server 20a with the configuration A, and the application program 210 of the old version operates on the AP server 20b with the configuration B.

That is, access requests by the application programs 210 of the plurality of versions are present together in a period during which the processing in Steps S1 to S3 is performed as described above with reference to FIG. 6. During the same period, data items for which the access requests are transmitted are present in both the old database 80-1 and the new database 80-2.

Therefore, the DB access program 211-1 for processing during the transition is made to operate on the AP servers 20a and 20b as described above with reference to FIG. 6 in the embodiment. Then, the DB access program 211-1 for processing during the transition determines the database 80, to which an access request is to be transmitted, based on the patch application state of the application program 210 included in the access request and the target data transition state. That is, the DB access program 211-1 for processing during the transition appropriately determines the database 80 to which the access request is to be transmitted.

In doing so, it is possible to access the database 80-1 or 80-2 by the application program 210 on each AP servers 20a or 20b without causing inconsistency of data. That is, it is possible to appropriately execute access requests to the DB server 10 even in a case in which data as a target of access is present in both the databases 80-1 and 80-2 with different data configurations and the access requests are issued by the application programs 210 of the plurality of versions.

In addition, the operator introduces the DB access program 211-1 for processing during the transition to the AP servers 20a and 20b in advance in Steps S1 and S2. In doing so, it is possible to perform processing of controlling an access request by the DB access program 211-1 for processing during the transition in Step S3.

S4: In Step S4, the AP server 20b with the configuration B is activated, and both the AP servers 20a and 20b with the configurations A and B are brought into the operating state ("A→B" in FIG. 8). That is, the AP servers 20a and 20b with the configurations A and B are brought into the switching state. At this time, the DB access program 211-2 for processing after completion of the transition operates in addition to the application program 210 of the new version on the AP server 20b with the configuration B.

During the switching state in Step S4, the application program 210 of the new version operates on both the AP servers 20a and 20b with the configurations A and B. That is, only the application program 210 of the new version operates. In addition, the DB transition processing by the DB background-updating program 212 is completed in Step S3. Therefore, the old database 80-1 and the DB background-updating program 212 are brought into a deletion waiting state ("DELETION WAITING" in FIG. 8) during the switching state in Step S4.

In Step 4, the operator suspends the AP server 20a with the configuration A after the switching state. Then, the operator updates the DB access program 211-1 for processing during the transition on the AP server 20a with the configuration A to the DB access program 211-2 for processing after completion of the transition in accordance with the management information ("A PATCH" in FIG. 8). In addition, the operator deletes the DB background-updating program 212 on the AP server 20a with the configuration A ("DELETED" in FIG. 8) and deletes the old database 80-1 ("NONE" in FIG. 8).

In doing so, the applications of the patch to the application programs 210 on the AP servers 20a and 20b with the configurations A and B are completed, and the transition processing from the old database 80-1 to the new database 80-2 is completed after Step S4.

According to the embodiment, it is possible to execute appropriate access requests to the DB server 10 even in the case in which access target data items are present in both the database 80-1 and 80-2 and the access requests are issued by the application programs 210 of the plurality of versions as described above. Therefore, it is possible to execute at least one application program 210 even in the case in which the patch that accompanies a change in data configurations in the database 80 is sequentially applied to the plurality of application programs 210. Accordingly, it is possible to apply the patch that accompanies a change in data configurations in the database 80 to the application programs 210 without suspending services provided by the application programs 210.

According to the embodiment, the program of the DB software 110 that operates on the DB server 10 is not changed in the processing of applying the patch to the application programs 210. In the embodiment, only the programs that operate on the AP servers 20a and 20b are updated. Therefore, since the processing is not performed on the other servers (the DB server 10, for example) in updating the application programs 210, it is possible to suppress a range of influence due to the update of the application programs 210.

According to the embodiment, the DB background-updating program 212 is made to operate in addition to the DB access program 211-1 for processing during the transition on the AP servers 20a and 20b on which the application programs 210 of the plurality of versions operate. The DB background-updating program 212 performs the transition processing of changing the respective data in the old database 80-1 to have the data configuration in the new database 80-2 and adding the respective data to the new database 80-2 in the background. Therefore, according to the embodiment, it is possible to apply the patch to the application programs 210 and to perform the transition processing of the database 80 without suspending the services provided by the application programs 210. Accordingly, it is possible to avoid permanent conversion processing based on a difference in the data configurations between the plurality of versions and to thereby suppress a processing load.

Management Information

Next, a description will be given of the management information that is used in the processing of applying the patch as illustrated in FIG. 8 with reference to FIGS. 9 and 10. The operator stores a file that is used in the processing of applying the patch in the non-volatile memories 202 (FIG. 3), for example, in the AP servers 20a and 20b via the management server described above with reference to FIG. 1 through the intranet. The operator stores the management information illustrated in FIGS. 9 and 10 along with the patch of the application program 210, the DB access program 211, and the DB background-updating program 212 illustrated in FIG. 5. The operator performs the processing of applying the patch as illustrated in FIGS. 6 to 8 based on the management information.

FIG. 9 is an explanatory diagram of first management information 310 that is used in the processing of applying the patch as illustrated in FIGS. 6, 7, and 8. The management information 310 illustrated in FIG. 9 includes a list of correction files of the application programs 210, a list of files of the DB access program 211-1 for processing during the transition and the DB access program 211-2 for processing after completion of the transition, and a list of files of the DB background-updating program 212.

The list of the correction files of the application programs 210 include names of files before the update and names of files after the update. The names of files before the update are names of files of the application programs 210 before the application of the patch. In addition, the names of files after the update are names of files of the application programs 210 after the application of the patch.

In addition, the list of files of the DB access program 211-1 for processing during the transition includes names of files before the update and names of files after the update. The names of files before the update are names of files of the DB access module 211 described above with reference to FIG. 4, for example. In addition, the names of files after the update are names of files of the DB access program 211-1 for processing during the transition illustrated in FIG. 5. Details of the DB access program 211-1 for processing during the transition will be described later with reference to FIGS. 11 to 23.

In addition, the list of files of the DB program 211-2 for processing after completion of the transition includes names of files before the update and names of files after the update. The names of files before the update are names of files of the DB access program 211-1 for processing during the transition. That is, the names of files before the update are the same as those after the update in the list of the files of the DB access program 211-1 for processing during the transition. The names of files after the update are names of files of the DB access program 211-2 for processing after completion of the transition.

Furthermore, the list of files of the DB background-updating program 212 includes names of files of the DB background-updating program 212 illustrated in FIG. 5. Details of the DB background-updating program 212 will be described later with reference to FIGS. 24 and 25.

Figure 10:
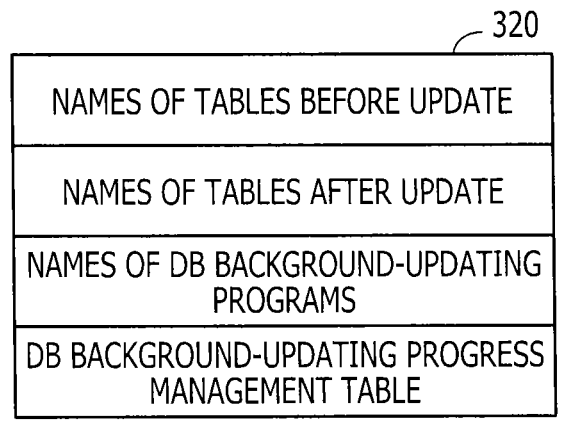
FIG. 10 is an explanatory diagram of second management information that is used in the processing of applying the patch as illustrated in FIGS. 6, 7, and 8.

FIG. 10 is an explanatory diagram of second management information 320 that is used in the processing of applying the patch as illustrated in FIGS. 6, 7, and 8.

The management information 320 illustrated in FIG. 10 includes names of tables (before the update and after the update) as targets of changes in the data configurations due to applications of the patch to the application programs 210. According to the embodiment, the names of tables as the targets of changes in the data configurations due to the applications of the patch are the names of tables illustrated as examples in FIG. 2. The operator generates the new empty database 80-2 based on the names of tables after the update as the targets of changes in the data configurations in the management information 320, for example (Step S1 in FIGS. 7 and 8).

In addition, the management information 320 illustrated in FIG. 10 includes names of the DB background-updating program and a new DB back-updating progress management table. The names of the DB background-updating programs are the same information as the list of files of the DB background-updating program 212 of the management information 310 illustrated in FIG. 9. The new DB back-updating progress management table is a management table indicating a progress of the transition processing of the DB background-updating program 212. The operator determines whether or not the transition processing has been completed with reference to the DB back-updating processing progress management table.

Next, details of the DB access program 211-1 for processing during the transition described above with reference to FIG. 5 will be described with reference to FIGS. 11 to 23. In addition, details of the DB background-updating program 212 described above with reference to FIG. 5 will be described with reference to FIGS. 24 and 25.

DB Access Program for Processing During Transition

Referring to FIGS. 11 to 23, the details of the DB access program 211-1 for processing during the transition depending on types of access requests will be described. As described above, access requests include, for example, addition of new data to the database 80 and update, search, and deletion of data stored in the database 80.

Access Request: Update

FIG. 11 is a diagram illustrating one type of DB access program 211-1 illustrated in FIG. 5 and illustrating a DB access program 211-1a for processing during a transition that responds to an access request indicating data update. The DB access program 211-1a includes a function "update".

Parameters of the function "update" are a value "table", a value "version", a value "data", and a value "id". The value "table" indicates identification information of a table as a target of update. The value "version" indicates a version (patch unapplied or patch applied) of the application program 210 that issues the access request. The value "data" indicates data as a target of update, and the value "id" indicates an identification number of the data as the target of update.

The DB access program 211-1a illustrated in FIG. 11 determines the database 80 to which the access request is to be transmitted based on a version of the application program 210 indicated by the value "version" and a transition state of the value "data" (data as a target of update).

That is, the DB access program 211-1a selects the new database 80-2 and updates the data regardless of the version of the application program 210 if the transition of the data as the target of update has already been made. In a case in which the transition of the data as the target of update has not yet been made, the DB access program 211-1a selects the new database 80-2 and updates the data if the version of the application program 210 is the new version. The DB access program 211-1a selects the old database 80-1 and updates the data if the version of the application program 210 is the old version.

In doing so, it is possible to appropriately perform the processing of updating the data even in the case in which the data as the target of update is present in both the old database 80-1 and the new database 80-2 and access requests by the application programs 210 of the old and new versions are present together.

If the version of the application program 210 that is indicated by the value "version" is different from the version of the application program 210 corresponding to the database 80 to which the access request is to be transmitted, the DB access program 211-1a converts the value "data". Hereinafter, the version of the application program 210 corresponding to the database 80 will be referred to as a version of the database 80.

That is, the DB access program 211-1a converts the data as the target of the update to have the data configuration of the new database 80-2 in a case of updating the data in the new database 80-2 in response to the access request from the application program 210 of the old version. In doing so, it is possible to appropriately perform the processing of updating the data even in a case in which the data that is included in the access request has a different data configuration from that in the database 80 to which the access request is transmitted.

A code cd11 in the DB access program 211-1a illustrated in FIG. 11 is a description in a case in which transition of the data as the target of the update to the new database 80-2 has already been made. The code cd12 is a description of processing in a case in which the transition of the data as the target of the update to the new database 80-2 has not yet been made. In addition, codes cd13 and cd14 are descriptions of processing of determining a version of the application program 210.

Next, a description will be given of processing performed by the DB access program 211-1a illustrated in FIG. 11 with reference to the flowchart in FIG. 12.

Figure 12:
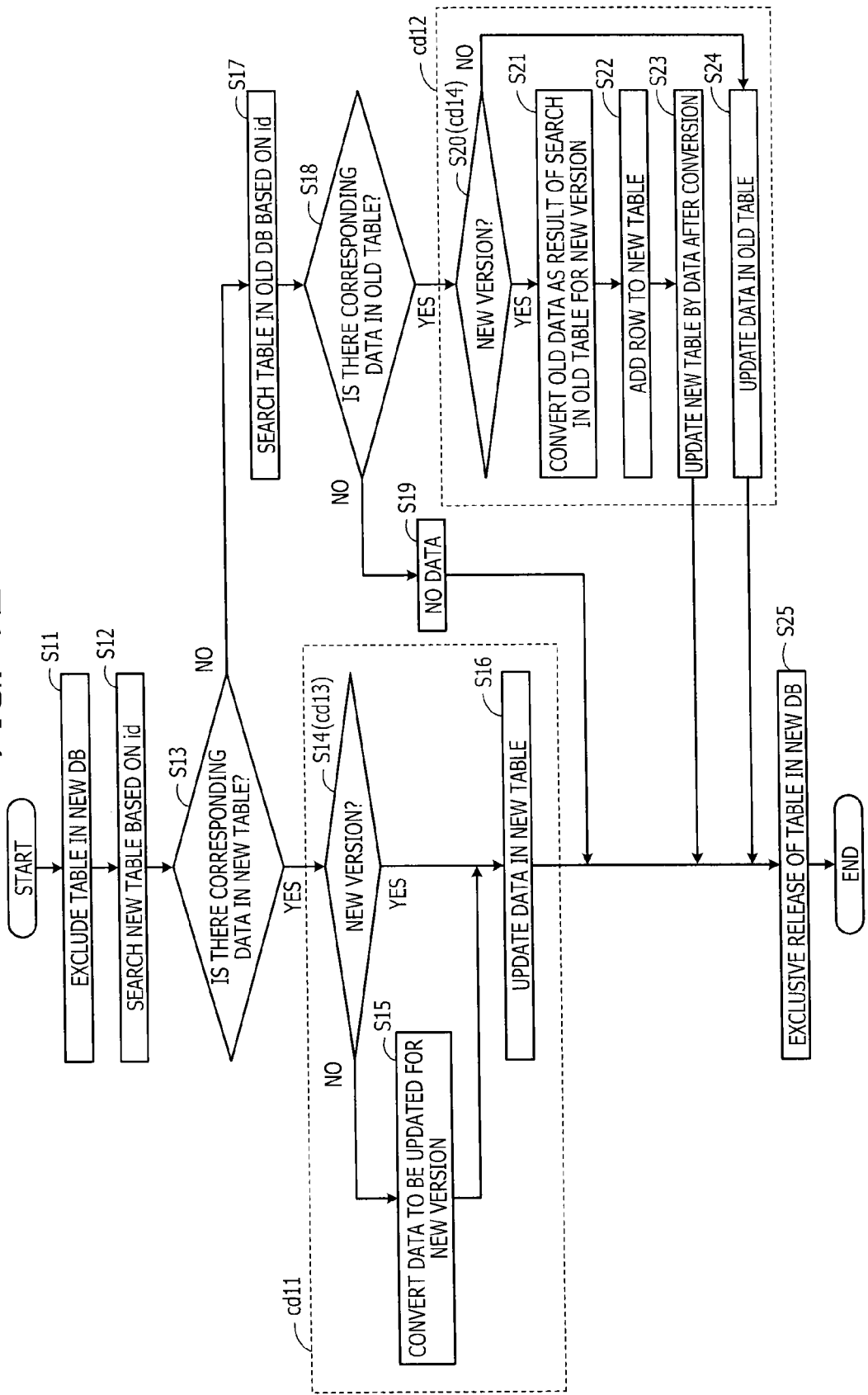
FIG. 12 is an explanatory flowchart of processing of the DB access program for processing during the transition illustrated in FIG. 11.

FIG. 12 is an explanatory flowchart of the processing of the DB access program 211-1a for processing during the transition illustrated in FIG. 11. The processing (code cd11) in the case in which the transition of the data as the target of the update to the new database 80-2 has already been made as illustrated in FIG. 11 corresponds to Steps S14 to S16 in FIG. 12. In addition, the processing (code cd12) in the case in which the transition of the data as the target of the update to the new database 80-2 has not yet been made as illustrated in FIG. 11 corresponds to Steps S20 to S24 in FIG. 12. In addition, the code cd13 illustrated in FIG. 11 corresponds to Step S14, and the code cd14 illustrated in FIG. 11 corresponds to Step S20.

S11: The DB access program 211-1a for processing during the transition performs exclusive control of a table as a target of update in the new database 80-2. In doing so, accesses to the table in the database 80-2 by the other programs are not available. According to the embodiment, exclusive management of the old database 80-1 is performed together by performing exclusive management of only the new database 80-2 as will be described later with reference to FIG. 23.

S12: The DB access program 211-1a for processing during the transition searches for the target table in the new database 80-2 based on the value "id" as a parameter.

S13: The DB access program 211-1a for processing during the transition determines whether or not the data corresponding to the value "id" is present in the target table in the new database 80-2.

S14: If the data corresponding to the value "id" is present in the target table in the new database 80-2 (YES in S13), this means that the transition of the data as the target of the update has already been made. The DB access program 211-1a for processing during the transition further determines whether or not the value "version" as a parameter indicates the new version (cd13 in FIG. 11). That is, the DB access program 211-1a for processing during the transition determines the version of the application program 210 that has issued the access request.

S15: If the value "version" indicates the old version (NO in S14), this means that the application program 210 of the old version has issued the access request. That is, Step S15 is for the case in which the version of the application program 210 that has issued the access request and the transition of the data as the target of the update has already been made. In such a case, the DB access program 211-1a for processing during the transition updates the data as the target of the update in the new database 80-2.

For this reason, the version of the application program 210 that has issued the access request is different from the version of the database 80 to which the access request has been transmitted. Therefore, the DB access program 211-1a for processing during the transition converts the value "data" as a target of writing (the data as the target of the update) to have the data configuration in the new database 80-2. In doing so, it is possible to appropriately perform the processing of updating the data even in the case in which the access to the new database 80-2 is made in response to the access request by the application program 210 of the old version.

In a case in which the version of the application program 210 that has issued the access request is the new version (YES in S14) and the transition of the data as the target of the update has already been made (YES in S13), the DB access program 211-1a for processing during the transition does not convert the value "data".

S16: The DB access program 211-1a for processing during the transition updates the target table in the new database 80-2 in accordance with the data as the target of the update that is indicated by the value "data". Steps S14 to S16 (cd11 in FIG. 11) correspond to processing in the case in which the transition of the data as the target of the update has already been made (YES in S13). In the case in which the transition of the data as the target of the update has already been made, the DB access program 211-1a for processing during the transition selects the new database 80-2 regardless of the version of the application program 210 that has issued the access request. Then, the DB access program 211-1a for processing during the transition updates the data as the target of the update in the new database 80-2.

S17: In a case in which the data with the value "id" is not present in the target table in the new database 80-2 (NO in S13), the DB access program 211-1a for processing during the transition searches for the target table in the old database 80-1 based on the value "id".

S18: The DB access program 211-1a for processing during the transition determines whether or not the data with the value "id" is present in the target table in the old database 80-1.

S19: If the data with the value "id" is not present in the target table in the old database 80-1 (NO in S18), this means that no data is present in both the databases 80-1 and 80-2. Therefore, the DB access program 211-1a for processing during the transition sets information, which indicates that the data as the target of the update is not present, as a result of the update.

S20: In a case in which the data with the value "id" is present in the target table in the old database 80-1 (YES in S18), this means that the transition of the data as the target of the update has not yet been made. That is, this means a case in which the data with the value "id" is not present in the new database 80-2 while being present in the old database 80-1. The DB access program 211-1a for processing during the transition further determines whether or not the value "version" indicates the new version (cd14 in FIG. 11).

S21: In the case in which the value "version" indicates the new version (YES in S20), this means that the application program 210 of the new version has issued the access request. That is, Step S21 is for the case in which the version of the application program 210 that has issued the access request is the new version and the transition of the data as the target of the update has not yet been made. The DB access program 211-1a for processing during the transition converts search result data in the old database 80-1 to have the data configuration in the new database 80-2.

S22: The DB access program 211-1a for processing during the transition adds the data after the conversion in Step S21 to the table in the new database 80-2. That is, the DB access program 211-1a for processing during the transition makes transition of the search result data to the new database 80-2.

S23: The DB access program 211-1a for processing during the transition updates the target table in the new database 80-2 in accordance with the data as the target of the update that is indicated by the value "data". In doing so, the DB access program 211-1a for processing during the transition makes the transition of the data as the target of the update included in the old database 80-1 to the new database 80-2 and updates the data as the target of the update.

S24: In a case in which the value "version" indicates the old version (NO in S20), this means that the application program 210 of the old version has issued the access request. The DB access program 211-1a for processing during the transition updates the target table in the old database 80-1 in accordance with the data as the target of the update that is indicated by the value "data".

In the case in which the transition of the data as the target of the update has not yet been made (YES in S18) as illustrated in Steps S20 to S24 (cd12 in FIG. 11), the DB access program 211-1a for processing during the transition refers to the version of the application program 210 that has issued the access request. Then, the DB access program 211-1a for processing during the transition selects the old database 80-1 or the new database 80-2 in accordance with the version of the application program 210 that has issued the access request, and updates the data as the target of the update.

S25: The DB access program 211-1a for processing during the transition performs exclusive release of the target table in the new database 80-2. In doing so, the other programs can access the table in the new database 80-2.

As illustrated in FIGS. 11 and 12, the DB access program 211-1a for processing during the transition determines the database 80-1 or 80-2 as the target of the update based on the version of the application program 210 that has issued the access request and the transition state of the data as the target of the update. In doing so, the DB access program 211-1a for processing during the transition can appropriately determine the database 80-1 or 80-2 to which the access request is to be transmitted. Therefore, it is possible to appropriately perform the update processing even in the case in which the data as the target of the update is present in both the old database 80-1 and the new database 80-2 and access requests by the application programs 210 of the old and new versions are present together.

Access Request: New Addition

FIG. 13 is a diagram illustrating one type of DB access program 211-1 illustrated in FIG. 5, which is a DB access program 211-1b for processing during a transition that responds to an access request indicating new data addition. The DB access program 211-1b includes a function "create".

Parameters of the function "create" are a value "table", a value "version", and a value "data". The value "table" indicates identification information of a table as a target of new addition. The value "version" indicates a version (patch unapplied or patch applied) of the application program 210 that has issued the access request. The value "data" indicates data as a target of new addition.

The DB access program 211-1*b* illustrated in FIG. 13 selects the new database 80-2 and adds data thereto regardless of the version of the application program 210 that is indicated by the value "version". Therefore, it is possible to suppress the amount of data as a target of the transition processing by the DB background-updating program 212.

In addition, the DB access program 211-1*b* converts the value "data" (data as the target of new addition) in a case in which the version of the application program 210 that is indicated by the value "version" is different from the version of the database 80 to which the access request is transmitted. That is, the DB access program 211-1*b* converts the data as the target of new addition to have the data configuration in the new database 80-2 in the case of adding the data to the new database 80-2 in response to a request for new addition from the application program 210 of the old version.

A code cd21 in the DB access program 211-1*b* indicates a description of the processing of determining the version of the application program 210. Next, a description will be given of processing by the DB access program 211-1*b* illustrated in FIG. 13 with reference to the flowchart illustrated in FIG. 14.

Figure 14:
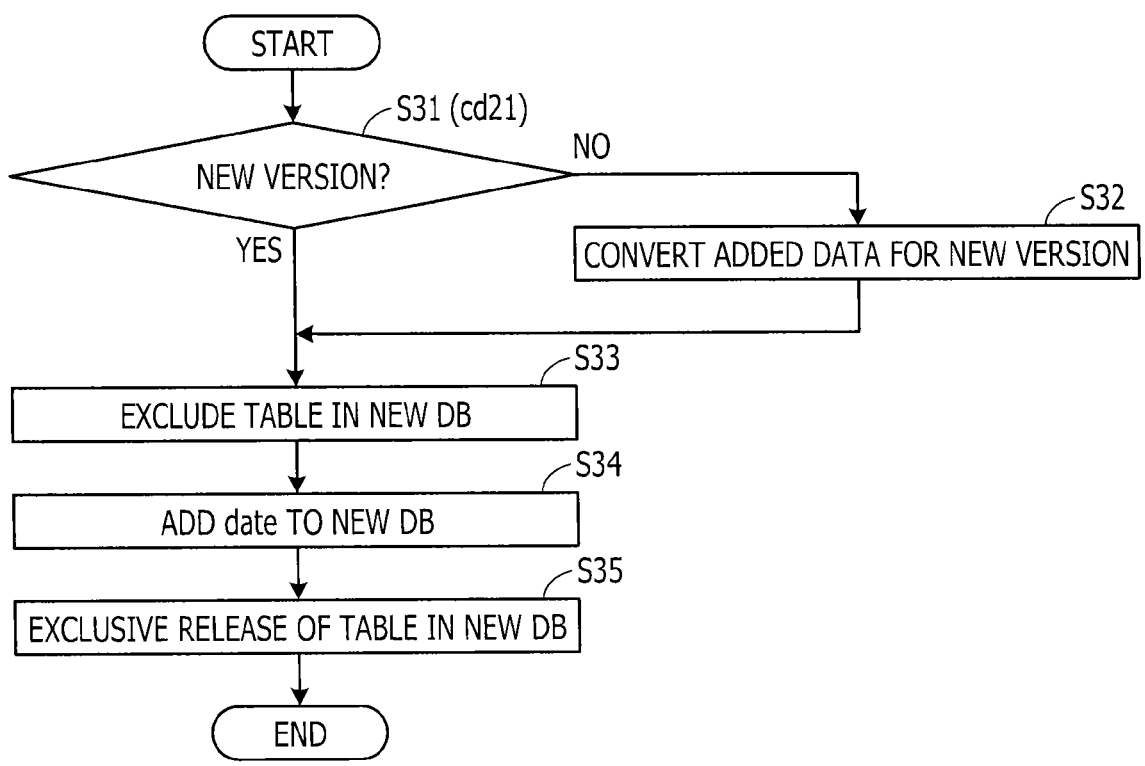
FIG. 14 is an explanatory flowchart of processing of the DB access program for processing during the transition illustrated in FIG. 13.

FIG. 14 is an explanatory flowchart of processing performed by the DB access program 211-1*b* for processing during the transition illustrated in FIG. 13. The code cd21 illustrated in FIG. 13 corresponds to Step S31.

S31: The DB access program 211-1*b* for processing during the transition determines whether or not the value "version" indicates the new version (cd21 in FIG. 13). That is, the DB access program 211-1*b* for processing during the transition determines the version of the application program 210 that has issued the access request.

S32: In a case in which the value "version" indicates the old version (NO in S31), this means that the application program 210 of the old version has issued the access request. The DB access program 211-1*b* for processing during the transition adds the data to be newly added to the target table in the new database 80-2 regardless of the version of the application program 210. For this reason, the version of the application program 210 that has issued the access request is different from the version of the database 80 to which the access request is transmitted. That is, the data included in the access request has a different data configuration from that in the database 80 to which the access request is transmitted.

Therefore, the DB access program 211-1*b* for processing during the transition converts the value "data" as a target of writing (data as the target of the new addition) to have the data configuration in the new database 80-2 in Step S32. In doing so, it is possible to appropriately perform the processing of newly adding the data even in the case in which access to the new database 80-2 is made in response to the access request by the application program 210 of the old version.

In the case in which the version of the application program 210 that has issued the access request is the new version (YES in S31), the DB access program 211-1*b* for processing during the transition does not convert the value "data".

S33: The DB access program 211-1*b* for processing during the transition performs exclusive control of the table as the target, to which the data is newly added, in the new database 80-2. In doing so, accesses to the table in the new database 80-2 by the other programs are not available.

S34: The DB access program 211-1*b* for processing during the transition adds the data as the target of new addition that is indicated by the value "data" to the target table in the new database 80-2.

S35: The DB access program 211-1*b* for processing during the transition performs exclusive release of the target table in the new database 80-2. In doing so, the other programs can access the table in the new database 80-2.

As illustrated in FIGS. 13 and 14, the DB access program 211-1*b* for processing during the transition determines the new database 80-2 as the database as the target of addition regardless of the version of the application program 210 that has issued the access request. In doing so, the DB access program 211-1*b* for processing during the transition can appropriately determine the database 80-1 or 80-2 to which the access request is to be transmitted. Therefore, it is possible to appropriately perform the addition processing even in the case in which the data as the target of addition is present in both the old database 80-1 and the new database 80-2 and access requests by the application programs 210 of the old and new versions are present together.

Access Request: Search

Figure 15:
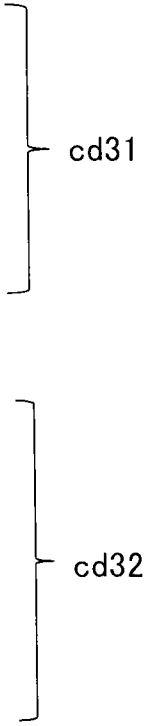
FIG. 15 is a diagram illustrating one type of DB access program illustrated in FIG. 5, which is a DB access program for processing during a transition that responds to an access request indicating data search.

FIG. 15 is a diagram illustrating one type of DB access program 211-1 illustrated in FIG. 5, which is a DB access program 211-1*c* for processing during a transition that responds to an access request indicating data search. The DB access program 211-1*c* includes a function "find".

Parameters of the function "find" is a value "table", a value "version", and a value "id". The value "table" indicates identification information of a table as a target of search. The value "version" indicates a version (patch unapplied or patch applied) of the application program 210 that has issued the access request. The value "id" indicates an identification number of data as a target of the search.

The DB access program 211-1*c* illustrated in FIG. 15 determines the database 80-1 or 80-2 to which the access request is to be transmitted based on the transition state of the data as the target of the search regardless of the version of the application program 210 that has issued the access request. That is, the DB access program 211-1*c* selects the new database 80-2 if the transition of the data as the target of the search to the new database 80-2 has already been made, or selects the old database 80-1 if the transition to the new database 80-2 has not yet been made, and performs the search processing.

In addition, the DB access program 211-1*c* converts the read search data in a case in which the version of the application program 210 that is indicated by the value "version" is different from the version of the database 80 to which the access request is transmitted. In doing so, it is possible to appropriately perform the processing of searching for the data even in the case in which the read data has a different data configuration from that in the database 80 to which the access request is transmitted.

That is, the DB access program 211-1*c* converts the read data to have the data configuration in the new database 80-2 in the case in which the old database 80-1 is searched in response to the access request from the application program 210 of the new version. In addition, the DB access program 211-1*c* converts the read data to have the data configuration in the old database 80-1 in the case in which the new database 80-2 is searched for in response to the access request from the application program 210 of the old version.

A code cd31 in the DB access program 211-1*c* illustrated in FIG. 15 is a description of processing in the case in which the transition of the data as the target of the search to the new database 80-2 has already been made. A code cd32 is a description of processing in the case in which the transition of the data as the target of the search to the new database 80-2 has not yet been made. In addition, codes cd33 and cd34 indicate descriptions of processing of determining a version of the application program 210.

Next, a description will be given of processing performed by the DB access program 211-1c illustrated in FIG. 15 with reference to the flowchart illustrated in FIG. 16.

Figure 16:
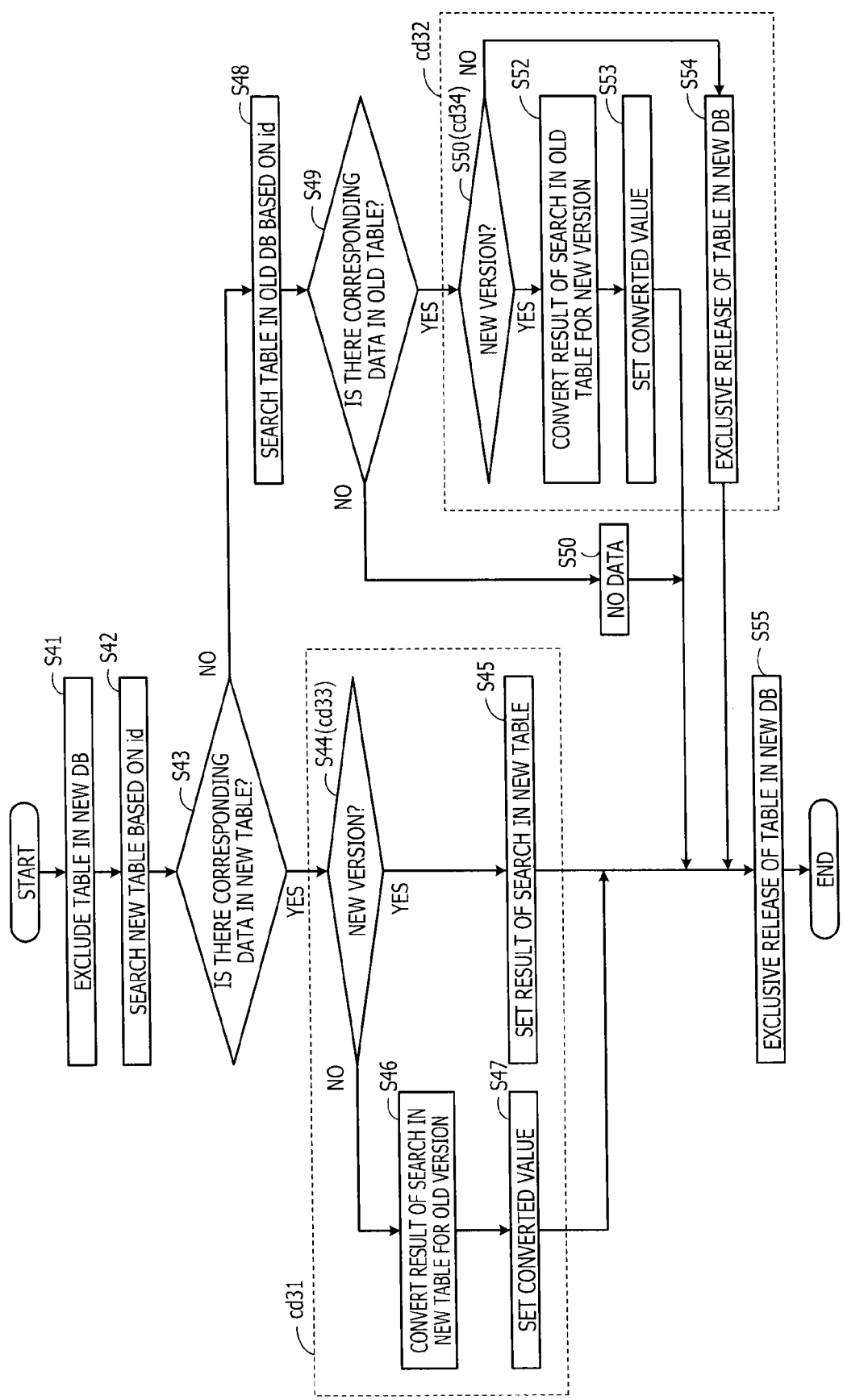
FIG. 16 is an explanatory flowchart of processing of the DB access program for processing during the transition illustrated in FIG. 15.

FIG. 16 is an explanatory flowchart of processing performed by the DB access program 211-1c for processing during the transition illustrated in FIG. 15. Processing in the case in which the transition of the data as the target of the search to the new database 80-2 has already been made (code cd31), which is illustrated in FIG. 15, corresponds to Steps S44 to S47 in FIG. 16. In addition, processing in the case in which the transition of the data as the target of the search to the new database 80-2 has not yet been made (code cd32), which is illustrated in FIG. 15, corresponds to Steps S51 to S54 in FIG. 16. In addition, the code cd33 illustrated in FIG. 15 corresponds to Step S44, and the code cd34 illustrated in FIG. 15 corresponds to Step S51.

S41: The DB access program 211-1c for processing during the transition performs exclusive control of the table as the target of the search in the new database 80-2. In doing so, accesses to the table in the new database 80-2 by the other programs are not available.

S42: The DB access program 211-1c for processing during the transition searches the target table in the new database 80-2 based on the value "id" as a parameter.

S43: The DB access program 211-1c for processing during the transition determines whether or not the data with the value "id" is present in the target table in the new database 80-2.

S44: If the data with the value "id" is present in the target table in the new database 80-2 (YES in S43), this means that the transition of the data as the target of the search has already been made. The DB access program 211-1c searches for the data as the target of the search in the new database 80-2 in the case in which the transition of the data as the target of the search to the new database 80-2 has already been made. The DB access program 211-1c for processing during the transition further determines whether or not the value "version" indicates the new version (cd33 in FIG. 15).

S45: In a case in which the value "version" indicates the new version (YES in S44), this means that the application program 210 of the new version has issued the access request. In Step S45, the version of the application program 210 that has issued the access request is the same as the version of the database 80 to which the access request is transmitted. Therefore, the DB access program 211-1c for processing during the transition sets the data of the result of the search in the new database 80-2 as a result of the search without converting the data.

S46: In contrast, if the value "version" indicates the old version (NO in S44), this means that the application program 210 of the old version has issued the access request. In Step S46, the version of the application program 210 that has issued the access request is different from the version of the database 80 as the target of the search. That is, the data included in the access request has a different data configuration as that in the database 80 to which the access request is transmitted.

Therefore, the DB access program 211-1c for processing during the transition converts the read data as the result of the search from the new database 80-2 to have the data configuration in the old database 80-1. In doing so, it is possible to appropriately perform the processing of searching data even in the case in which access to the new database 80-2 is made in response to the access request by the application program 210 of the old version.

S47: The DB access program 211-1c for processing during the transition sets the data converted in Step S46 as a result of the search. In the case in which the transition of the data as the target of the search to the new database 80-2 has already been made as illustrated in Steps S44 to S47 (cd31 in FIG. 15), the DB access program 211-1c searches for the data as the target of the search in the new database 80-2.

S48: In contrast, if the data with the value "id" is not present in the target table in the new database 80-2 (NO in S43), the DB access program 211-1c for processing during the transition searches the target table in the old database 80-1 based on the value "id".

S49: The DB access program 211-1c for processing during the transition determines whether or not the data with the value "id" is present in the target table in the old database 80-1.

S50: In a case in which the data with the value "id" is not present in the target table in the old database 80-1 (NO in S49), this means that the data is not present in both the databases 80-1 and 80-2. Therefore, the DB access program 211-1c for processing during the transition sets information, which indicates that the data as the target of the search is not present, as a result of the update.

S51: In a case in which the data with the value "id" is present in the target table in the old database 80-1 (YES in S49), this means that the transition of the data as the target of the search has not yet been made. The DB access program 211-1c searches for the data as the target of the search in the old database 80-1 in the case in which the transition of the data as the target of the search to the new database 80-2 has not yet been made. The DB access program 211-1c for processing during the transition further determines whether or not the value "version" indicates the new version (cd34 in FIG. 15).

S52: In the case in which the value "version" indicates the new version (YES in S51), this means that the application program 210 of the new version has issued the access request. In Step S52, the version of the application program 210 that has issued the access request is different from the version of the database 80 to which the access request is transmitted. That is, the data that is included in the access request has a different data configuration from that in the database 80 to which the access request is transmitted.

Therefore, the DB access program 211-1c for processing during the transition converts the data read in the old database 80-1 as a result of the search to have the data configuration in the new database 80-2. In doing so, it is possible to appropriately perform the processing of searching for the data even in the case in which the access to the old database 80-1 is made in response to the access request by the application program 210 of the new version.

S53: The DB access program 211-1c for processing during the transition sets the data converted in Step S52 as a result of the search.

S54: In a case in which the value "version" indicates the old version (NO in S51), this means that the application program 210 of the old version has issued the access request. In Step S54, the version of the application program 210 that has issued the access request is the same as the version of the database 80 to which the access request is transmitted. Therefore, the DB access program 211-1c for processing during the transition sets the data of the result of the search in the old database 80-1 as a result of the search without converting the data.

In the case in which the transition of the data as the target of the search to the new database 80-2 has not yet been made as illustrated in Steps S51 to S54 (cd32 in FIG. 15), the DB access program 211-1c searches for the data as the target of the search in the old database 80-1.

S55: The DB access program 211-1c for processing during the transition performs exclusive release of the target table in the new database 80-2. In doing so, the other programs can access the table in the new database 80-2.

As illustrated in FIGS. 15 and 16, the DB access program 211-1c for processing during the transition determines the database 80-1 or 80-2 as the target of the search based on the transition state of the data as the target of the search regardless of the version of the application program 210 that has issued the access request. In doing so, the DB access program 211-1c for processing during the transition can appropriately determine the database 80-1 or 80-2 to which the access request is to be transmitted. Therefore, it is possible to appropriately perform the search processing even in the case in which the data as the target of the search is present in both the old database 80-1 and the new database 80-2 and access requests by the application programs 210 of the old and new versions are present together.

Access Request: Condition Search (One Case)

FIG. 17 is a diagram illustrating one type of DB access program 211-1 illustrated in FIG. 5, which is a DB access program 211-1d for processing during a transition that responds to an access request indicating data condition search (one case). The data condition search means processing of searching for one data item with a specific value, which meets a predetermined condition, of an item in a table. The DB access program 211-1d includes a function "where".

Parameters of the function "where" are a value "table", a value "version", and a value "condition". The value "table" indicates identification information of a table as a target of the condition search. The value "version" indicates a version (patch unapplied or patch applied) of the application program 210 that has issued the access request. The value "condition" indicates a search condition.

The DB access program 211-1d illustrated in FIG. 17 determines the database 80 to which the access request is to be transmitted based on the transition state of the data as the target of the search regardless of the version of the application program 210 that has issued the access request. Specifically, the DB access program 211-1d searches for data that meets a search condition in the old database 80-1 and the new database 80-2 and selects a result of the search of one of the databases 80-1 and 80-2 in accordance with the transition state of the data as the target of the search.

In the same manner as in FIGS. 15 and 16, the DB access program 211-1d converts the read data as the result of the search in the case in which the version of the application program 210 that is indicated by the value "version" is different from the version of the database 80 to which the access request is transmitted. Codes cd41 and cd42 in the DB access program 211-1d in FIG. 17 indicate descriptions of the processing of determining the version of the application program 210. In addition, a code cd43 indicates a description of the processing of determining a result of the search in the old database 80-1 and the new database 80-2.

Next, a description will be given of processing performed by the DB access program 211-1d illustrated in FIG. 17 with reference to the flowchart illustrated in FIG. 18A and FIG. 18B.

Figure 18A:
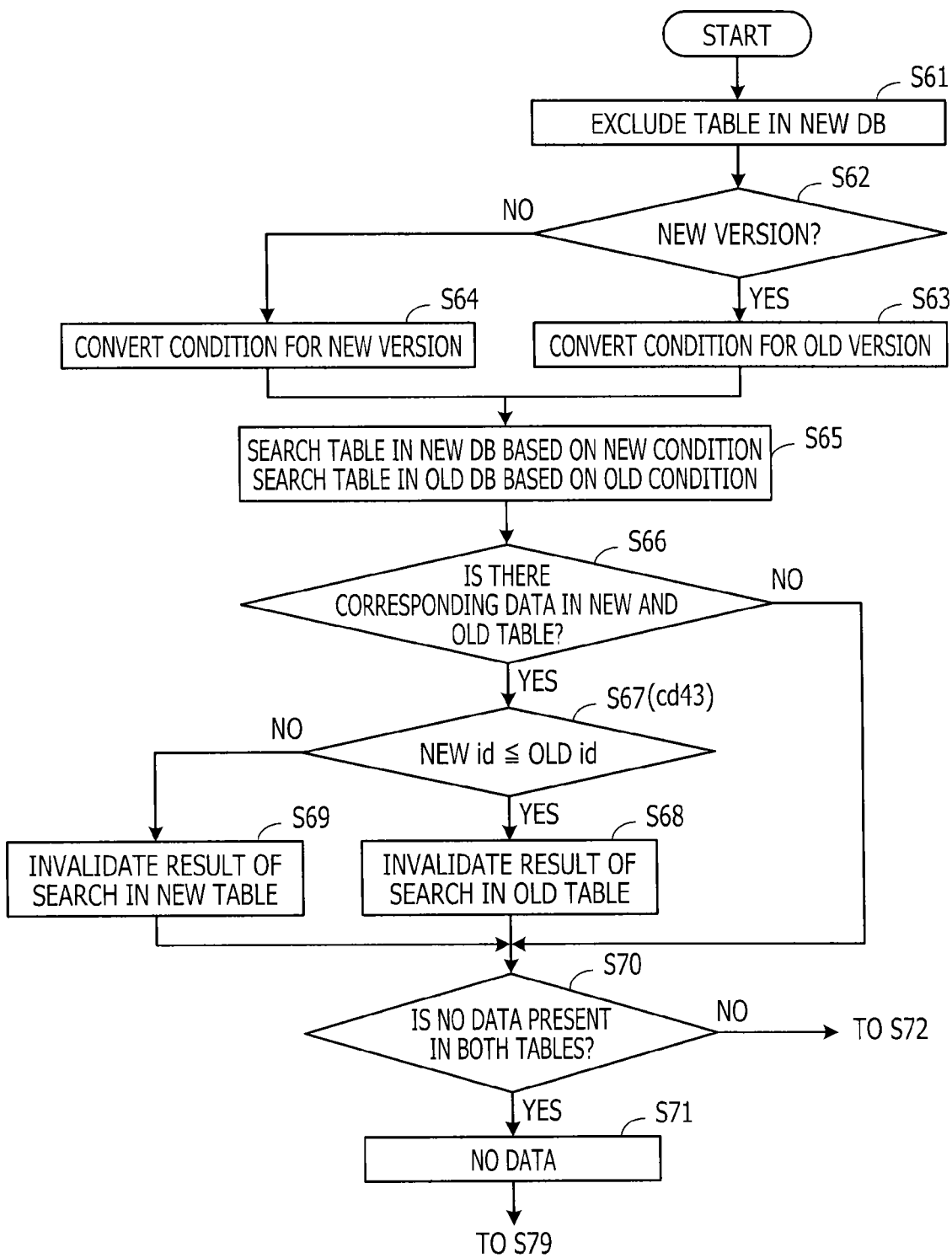
FIG. 18A and FIG. 18B are an explanatory flowchart of processing of the DB access program for processing during the transition illustrated in FIG. 17.
Figure 18B:
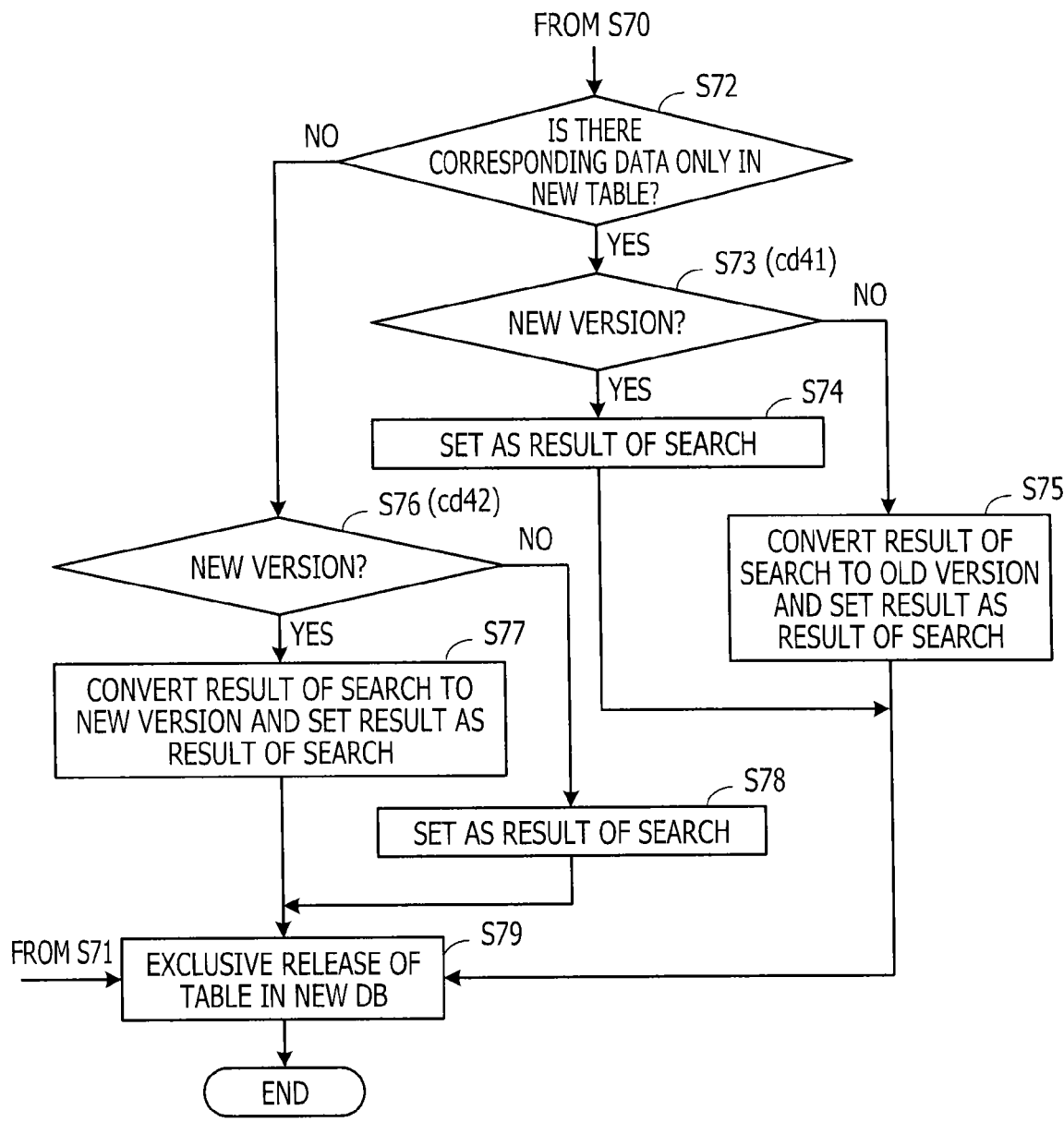

FIG. 18A and FIG. 18B are exemplary flowcharts of processing performed by the DB access program 211-1d for processing during the transition illustrated in FIG. 17. The code cd41 illustrated in FIG. 17 corresponds to Step S73, and the code cd42 illustrated in FIG. 17 corresponds to Step S76. In addition, the code cd43 illustrated in FIG. 17 corresponds to Step S67.

S61: The DB access program 211-1d for processing during the transition performs exclusive control of a table as a target of the condition search in the new database 80-2. In doing so, accesses to the table in the new database 80-2 by the other programs are not available.

S62: The DB access program 211-1d for processing during the transition determines whether or not the value "version" indicates the new version.

S63: In a case in which the value "version" indicates the new version (YES in S62), this means that the application program 210 of the new version has issued the access request. Therefore, the DB access program 211-1d for processing during the transition converts the value "condition" in accordance with a specification of the old version.

S64: In contrast, if the value "version" indicates the old version (NO in S62), this means that the application program 210 of the old version has issued the access request. Therefore, the DB access program 211-1d for processing during the transition converts the value "condition" in accordance with a specification of the new version.

S65: The DB access program 211-1d for processing during the transition searches for the target table in the old database 80-1 and the new database 80-2 in accordance with the value "condition", S66: The DB access program 211-1d for processing during the transition determines whether or not there is data that meets the value "condition" in both the old database 80-1 and the new database 80-2.

S67: In a case in which there is data that meets the value "condition" in both the databases 80 (YES in S66), the DB access program 211-1d for processing during the transition determines a result of the search (cd43 in FIG. 17). Specifically, the DB access program 211-1d for processing during the transition determines whether or not the value "id" as a result of the search in the new database 80-2 is a value that is equal to or less than the value "id" as the result of the search in the old database 80-1.

In the example illustrated in FIGS. 17 and 18, values "id" that meet the search condition are searched in an ascending order of the values "id". According to the embodiment, the DB background-updating program 212 sequentially performs data transition processing. Therefore, ratios of data items that are stored in the respective databases 80-1 and 80-2 are different depending on a progress of the data transition processing. That is, in a case in which the transition processing slightly proceeds, this means that a major part of data is stored in the old database 80-1. In the case of searching the search condition in the ascending order of the values "id", there is a high possibility that a value "id" as the result of the search in one of the databases 80-1 and 80-2, which stores more data, is smaller. Therefore, the DB access program 211-1d for processing during the transition compares the values "id" as the results of the search and employs the search result of the smaller value "id".

S68: In a case in which the value "id" as the result of the search in the new database 80-2 is a value that is equal to or less than the value "id" as the result of the search in the old database 80-1 (YES in S67), the DB access program 211-1d for processing during the transition employs the result of the search in the new database 80-2. The DB access program

211-1*d* for processing during the transition invalidates the result of the search in the old database 80-1. That is, the DB access program 211-1*d* for processing during the transition changes the result of the search to indicate that the data that meets the value "condition" is present only in the new database 80-2.

S69: In contrast, if the value "id" as the result of the search in the new database 80-2 is greater than the value "id" as the result of the search in the old database 80-1 (NO in S67), the DB access program 211-1*d* for processing during the transition employs the result of the search in the old database 80-1. The DB access program 211-1*d* for processing during the transition invalidates the result of the search in the new database 80-2. That is, the DB access program 211-1*d* for processing during the transition changes the result of the search to indicate that the data that meets the value "condition" is present only in the old database 80-1.

S70: The DB access program 211-1*d* for processing during the transition determines whether no data meets the value "condition" in both the old database 80-1 and the new database 80-2.

S71: In the case in which no data meets the value "condition" in both the databases 80-1 and 80-2 (YES in S70), the DB access program 211-1*d* for processing during the transition sets an indication that there is no data that meets the value "condition" in the result of the search.

S72: In a case in which the data that meets the value "condition" is present in any of the databases 80-1 and 80-2 (NO in S70), the DB access program 211-1*d* for processing during the transition determines whether or not the data that meets the value "condition" is present only in the new database 80-2.

S73: In a case in which the data that meets the value "condition" is present only in the new database 80-2 (YES in S72), the DB access program 211-1*d* for processing during the transition further determines whether or not the value "version" indicates the new version (cd41 in FIG. 17). In a case of corresponding Step S68, the processing proceeds to Step S73.

S74: In a case in which the value "version" indicates the new version (YES in S73), this means that the application program 210 of the new version has issued the access request. In Step S74, the version of the application program 210 that has issued the access request is the same as the version of the database 80 to which the access request is transmitted. Therefore, the DB access program 211-1*d* for processing during the transition sets the data corresponding to the value "id" as the result of the search in the new database 80-2 as the result of the search without converting the data.

S75: In contrast, if the value "version" indicates the old version (NO in S73), this means that the version of the application program 210 that has issued the access request is different from the version of the database 80 to which the access request is transmitted. Therefore, the DB access program 211-1*d* for processing during the transition converts the data corresponding to the value "id" as the result of the search in the new database 80-2 to have the data configuration in the old database 80-1, and sets the data as the result of the search in the same manner as in FIG. 16.

S76: In contrast, if the data that meets the value "condition" is present only in the old database 80-1 (NO in S72), the DB access program 211-1*d* for processing during the transition further determines whether or not the value "version" indicates the new version (cd42 in FIG. 17). In a case of corresponding Step S69, the processing proceeds to Step S76.

S77: In a case in which the value "version" indicates the new version (YES in S76), this means that the application program 210 of the new version has issued the access request. In Step S77, the version of the application program 210 that has issued the access request is different from the version of the database 80 to which the access request is transmitted. Therefore, the DB access program 211-1*d* for processing during the transition converts the data corresponding to the value "id" as the result of the search in the old database 80-1 to have the data configuration in the new database 80-2 and sets the data as the result of the search in the same manner as in FIG. 16.

S78: In a case in which the value "version" indicates the old version (NO in S73), the version of the application program 210 that has issued the access request is the same as the version of the database 80 to which the access request is transmitted. Therefore, the DB access program 211-1*d* for processing during the transition sets the data corresponding to the value "id" as the result of the search in the old database 80-1 as the result of the search without converting the data.

S79: The DB access program 211-1*d* for processing during the transition performs exclusive release of the target table in the new database 80-2. In doing so, the other programs can access the table in the new database 80-2.

As illustrated in FIGS. 17 and 18, the DB access program 211-1*d* for processing during the transition determines the database 80-1 or 80-2 to which the access request is to be transmitted based on the transition state of the data regardless of the version of the application program 210 that has issued the access request. Therefore, it is possible to appropriately perform the condition search processing even in the case in which the data as the target of the search is present in both the old database 80-1 and the new database 80-2 and access requests by the application programs 210 of the old and new versions are present together.

Access Request: Condition Search (All Cases)

FIG. 19 is a diagram illustrating one type of DB access program 211-1 illustrated in FIG. 5, which is a DB access program 211-1*e* for processing during a transition that responds to an access request indicating data condition search (all cases). The DB access program 211-1*e* includes a function "all".

Parameters of the function all is a value "table", a value "version", and a value "condition". The respective values are the same as those in FIG. 17. The DB access program 211-1*e* illustrated in FIG. 19 determines a database 80 to which the access request is to be transmitted based on the transition state of the data as the target of the search regardless of the version of the application program 210 that has issued the access request. Specifically, the DB access program 211-1*e* searches for data that meets the search condition in the old database 80-1 and the new database 80-2 in accordance with the transition state of the data, and sums up the results of the search in both the databases so as not cause overlapping.

In addition, the DB access program 211-1*e* illustrated in FIG. 19 converts the read data of the result of the search in a case in which the version of the application program 210 that is indicated by the value "version" is different from the version of the database 80 to which the access request is transmitted. This is the same as the conversion processing for the condition search (one case) illustrated in FIGS. 17 and 18. A code cd51 in the DB access program 211-1*e* in FIG. 19 indicates a description of processing of determining the version of the application program 210.

Next, a description will be given of processing performed by the DB access program 211-1e illustrated in FIG. 19 with reference to the flowchart in FIG. 20.

Figure 20:
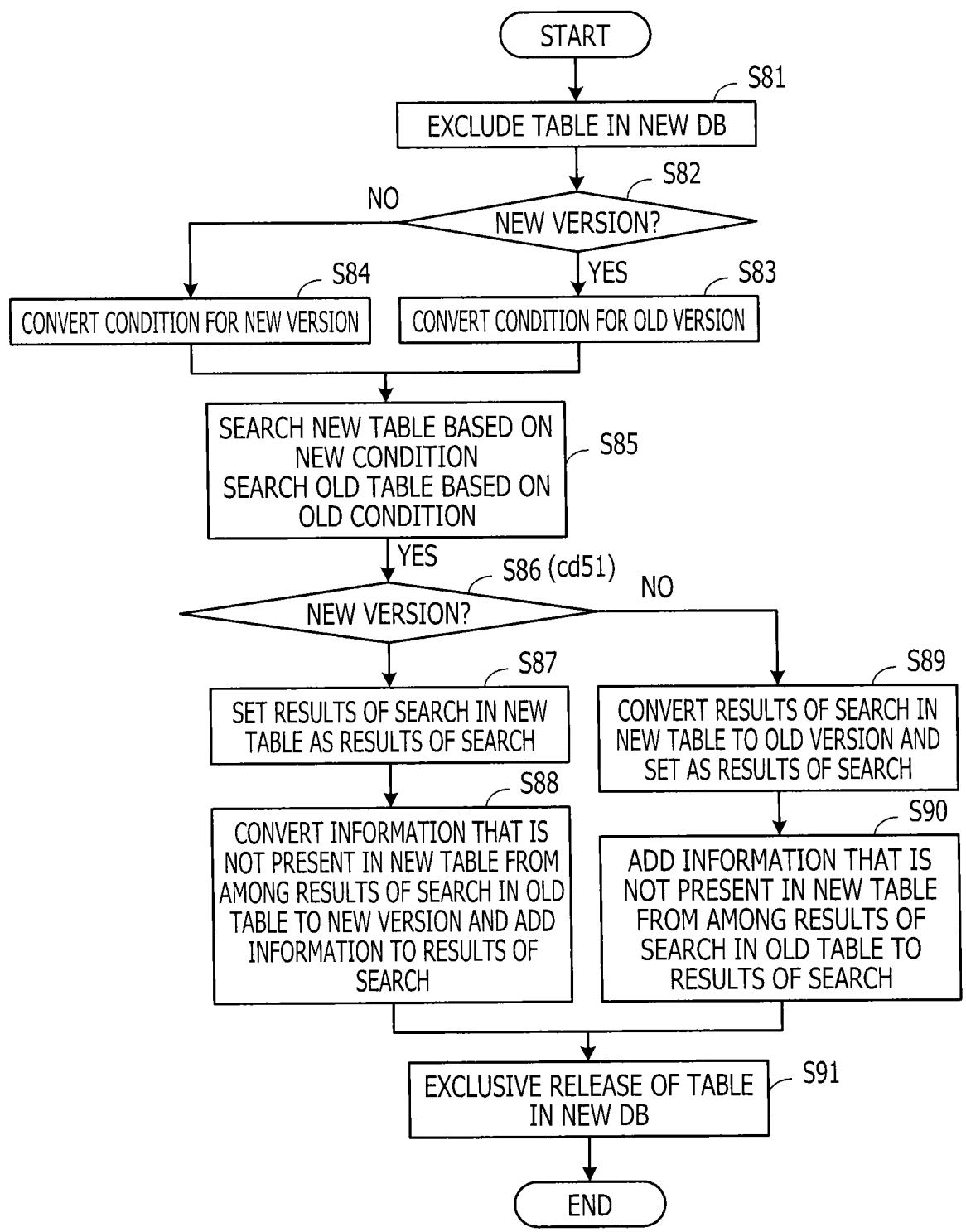
FIG. 20 is an explanatory flowchart of processing of the DB access program for processing during the transition illustrated in FIG. 19.

FIG. 20 is an explanatory flowchart of processing performed by the DB access program 211-1e for processing during the transition illustrated in FIG. 19. A code cd51 illustrated in FIG. 19 corresponds to Step S86. Since Steps S81 to S85 in the flowchart in FIG. 20 is the same as Step S61 to S65 in the flowchart in FIG. 18, descriptions thereof will be omitted.

S86: The DB access program 211-1e for processing during the transition further determines whether or not the value "version" indicates the new version (cd51 in FIG. 19).

S87: In a case in which the value "version" indicates the new version (YES in S86), this means that the application program 210 of the new version has issued the access request. The DB access program 211-1e for processing during the transition sets all the data items that meet the value "condition" in the new database 80-2 as results of the search.

S88: The DB access program 211-1e for processing during the transition converts data that is not present in the new database 80-2 from among the data items that meet the value "condition" in the old database 80-1 to have the data configuration in the new database 80-2 and adds the data to the results of the search. In doing so, the DB access program 211-1e for processing during the transition sums up the results of the search in the old database 80-1 and the new database 80-2.

S89: In a case in which the value "version" indicates the old version (NO in S86), this means that the application program 210 of the old version has issued the access request. The DB access program 211-1e for processing during the transition converts all the data items that meet the value "condition" in the new database 80-2 to have the data configuration in the old database 80-1 and sets the data as results of the search.

S90: The DB access program 211-1e for processing during the transition adds data that is not present in the new database 80-2 from among the data items that meet the value "condition" in the old database 80-1 to the results of the search. In doing so, the DB access program 211-1e for processing during the transition sums up the results of the search in the old database 80-1 and the new database 80-2.

S91: The DB access program 211-1e for processing during the transition performs exclusive release of the target table in the new database 80-2. In doing so, the other programs can access the table in the new database 80-2.

As illustrated in FIGS. 19 and 20, the DB access program 211-1e for processing during the transition selects the database 80-1 or 80-2 as the target of the search of a plurality of data items regardless of the version of the application program 210 that has issued the access request. Therefore, it is possible to appropriately perform the condition search processing even in the case in which the data as the target of the search is present in both the old database 80-1 and the new database 80-2 and access requests by the application programs 210 of the old and new versions are present together.

Access Request: Deletion

FIG. 21 is a diagram illustrating one type of DB access program 211-1 illustrated in FIG. 5, which is a DB access program 211-1f for processing during a transition that responds to an access request indicating data deletion. The DB access program 211-1f includes a function "destroy".

Parameters of the function "destroy" is a value "table", a value "version", and a value "id". The value "table" indicates identification information of a table as a target of deletion. The value "version" indicates a version (patch unapplied or patch applied) of the application program 210 that has issued the access request. The value "id" indicates identification information of data as a target of the deletion.

The DB access program 211-1f illustrated in FIG. 21 determines the database 80 to which the access request is to be transmitted based on a transition state of a DB of the value "data" (data as the target of the deletion) regardless of the version of the application program 210 that is indicated by the value "version". That is, the DB access program 211-1f deletes the target data from both the databases 80-1 and 80-2 in a case in which the target data is present in the new database 80-2 as well as the old database 80-1.

As described above, the DB access program 211-1f for processing during the transition may select the plurality of databases 80-1 and 80-2. A code cd61 in the DB access program 211-1f is a description of processing in a case in which transition of the data as the target of the deletion to the new database 80-2 has already been made.

Next, a description will be given of processing performed by the DB access program 211-1f illustrated in FIG. 21 with reference to the flowchart illustrated in FIG. 22.

Figure 22:
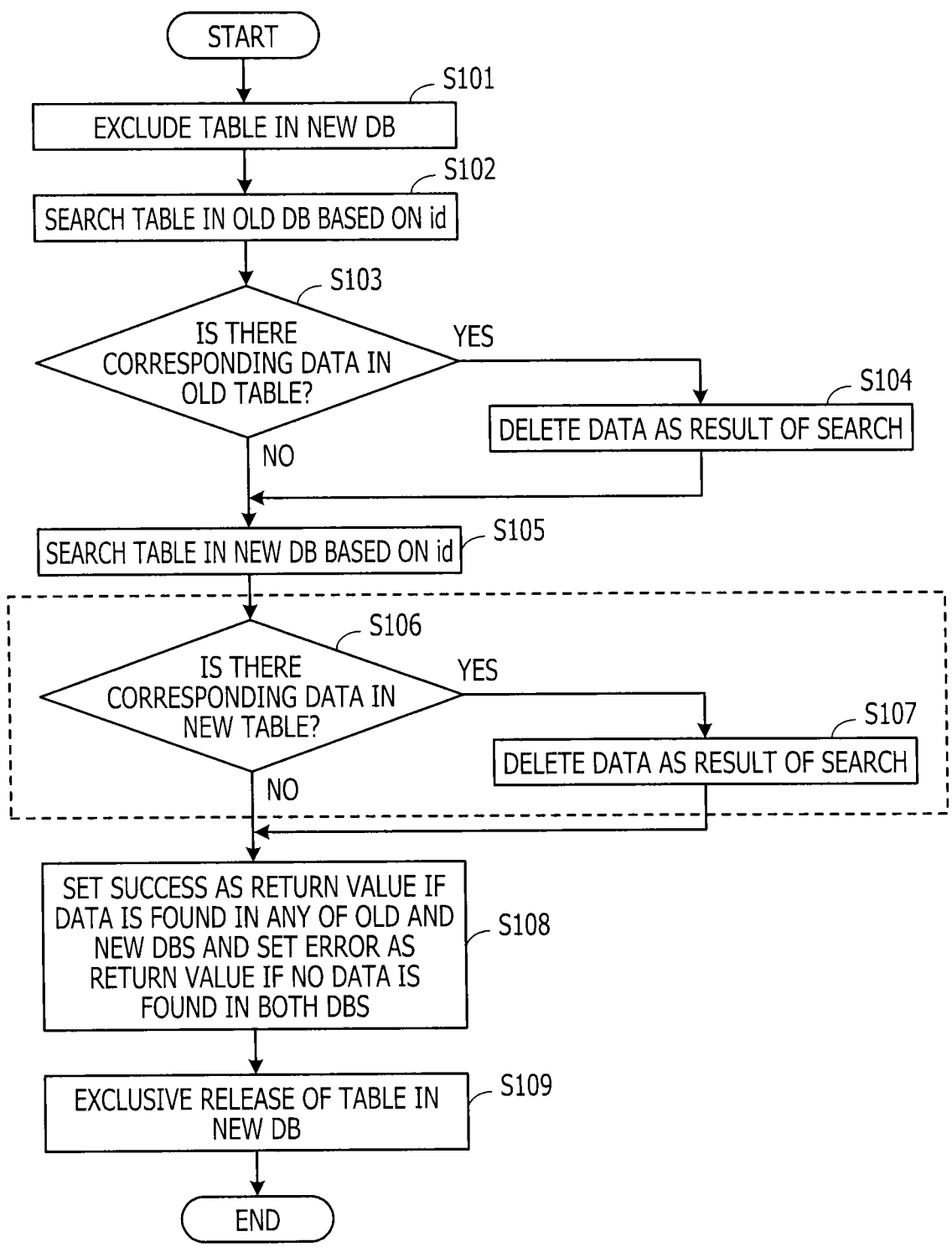
FIG. 22 is an explanatory flowchart of processing of the DB access program for processing during the transition illustrated in FIG. 21.

FIG. 22 is an explanatory flowchart of processing performed by the DB access program 211-1f for processing during the transition illustrated in FIG. 21. A code cd61 illustrated in FIG. 21 corresponds to Steps S106 and S107.

S101: The DB access program 211-1f for processing during the transition performs exclusive control of a table as a target of deletion in the new database 80-2. In doing so, the accesses to the table in the new database 80-2 by the other programs are not available.

S102: The DB access program 211-1f for processing during the transition searches for the target table in the old database 80-1 based on the value "id" as a parameter.

S103: The DB access program 211-1f for processing during the transition determines whether or not data with the value "id" is present in the target table in the old database 80-1.

S104: In a case in which the data corresponding to the value "id" is present in the target table in the old database 80-1 (YES in S103), the DB access program 211-1f for processing during the transition deletes the data corresponding to the value "id" from the old database 80-1.

S105: The DB access program 211-1f for processing during the transition searches for the target table in the new database 80-2 based on the value "id" as a parameter.

S106: The DB access program 211-1f for processing during the transition determines whether or not the data with the value "id" is present in the target table in the new database 80-2.

S107: In a case in which the data corresponding to the value "id" is present in the target table in the new database 80-2 (YES in S106), the DB access program 211-1f for processing during the transition deletes the data corresponding to the value "id" from the new database 80-2. In the case in which the transition of the data as the target of the deletion has already been made (YES in S106) as illustrated in Steps S106 and S107 (cd61 in FIG. 21), the DB access program 211-1f for processing during the transition further determines the new database 80-2 as the database 80 as the target of the deletion.

S108: The DB access program 211-1f for processing during the transition sets a return value. The DB access program 211-1f for processing during the transition sets a value (SUCCESS) that indicates success as the return value in a case in which the data corresponding to the value "id"

is present in any of the old database 80-1 and the new database 80-2 (YES in S103 or YES in S106). In contrast, if the value corresponding to the value "id" is not present in any of the old database 80-1 and the new database 80-2 (NO in S103 and NO in S106), the DB access program 211-1ƒ for processing during the transition sets a value (ERROR) that indicates an error as the return value.

S109: The DB access program 211-1ƒ for processing during the transition performs exclusive release of the target table in the new database 80-2. In doing so, the other programs can access the table in the new database 80-2.

As illustrated in FIGS. 21 and 22, the DB access program 211-1ƒ for processing during the transition determines the database 80-1 or 80-2 as the target of the deletion in accordance with the transition state of the data as the target of the deletion regardless of the version of the application program 210. Therefore, it is possible to appropriately perform the deletion processing even in the case in which the data as the target of the deletion is present in both the old database 80-1 and the new database 80-2 and access requests by the application programs 210 of the old and new versions are present together.

FIG. 23 is a diagram illustrating examples of DB access programs 211-1g to 211-1j for describing other processing performed by the DB access program 211-1 for processing during the transition illustrated in FIG. 5.

The DB access program 211-1g illustrated in FIG. 23 includes a function "lock" for performing exclusive control of entire tables. In addition, the DB access program 211-1h includes a function "unlock" for performing exclusive release of the entire tables. The function "lock" and the function "unlock" are for performing the exclusive control and the exclusive release of tables only in the new database 80-2.

According to the embodiment, the DB access program 211-1 (211-1a to 211-1ƒ) for processing during the transition performs processing of accessing the new database 80-2 and processing of accessing the old database 80-1 as a set. Therefore, exclusive management of both the databases 80-1 and 80-2 is realized by performing exclusive management of only the new database 80-2 from among the old database 80-1 and the new database 80-2. In doing so, it is possible to reduce the processing amount in the exclusive control and to suppress a load on the programs.

In addition, the DB access program 211-1i illustrated in FIG. 23 includes a function "lock" for performing exclusive control of one data item. In addition, the DB access program 211-1j includes a function "unlock" for performing exclusive release of one data item. The DB access programs 211-1i and 211-1j also realize exclusive management of both the databases 80-1 and 80-2 by performing the exclusive control or the exclusive release of the table only in the new database 80-2 in the same manner. In doing so, it is possible to reduce the processing amount in the exclusive control and to suppress a load on the programs.

DB Background-Updating Program

Details of the DB background-updating program 212 will be described with reference to FIGS. 24 and 25.

Figure 24:
FIG. 24 is a diagram illustrating an exemplary DB background-updating program illustrated in FIG. 5.

FIG. 24 is a diagram illustrating an example of the DB background-updating program 212 illustrated in FIG. 5. The DB background-updating program 212 illustrated in FIG. 24 sequentially converts the data in the old database 80-1 to have the data configuration in the new database 80-2 and adds the data to the new database 80-2. At this time, the DB background-updating program 212 deletes the data after transition, which has been added to the new database 80-2, from the old database 80-1. The DB background-updating program 212 makes transition of all the data items in the old database 80-1 by repeating the processing illustrated in FIG. 24.

According to the embodiment, the processing of converting data as a target of access does not occur after completion of the data transition processing performed by the DB background-updating program 212. The conversion processing is processing of converting data, illustrated in FIGS. 11 to 23, in a case in which the version of the application program 210 that has issued the access request is different from the version of the database 80 to which the access request is transmitted. That is, the conversion processing corresponds to Step S15 in FIG. 12, Step S32 in FIG. 14, or Steps S46 and S52 in FIG. 16, for example. Therefore, according to the embodiment, it is possible to avoid permanent occurrence of the processing of converting the data and to thereby suppress a load caused by the processing of converting the data.

A code cd71 in the DB background-updating program 212 illustrated in FIG. 24 indicates a description of processing of converting the data in the old database 80-1 to have the data configuration in the new database 80-2 and adding the data to the new database 80-2.

Figure 25:
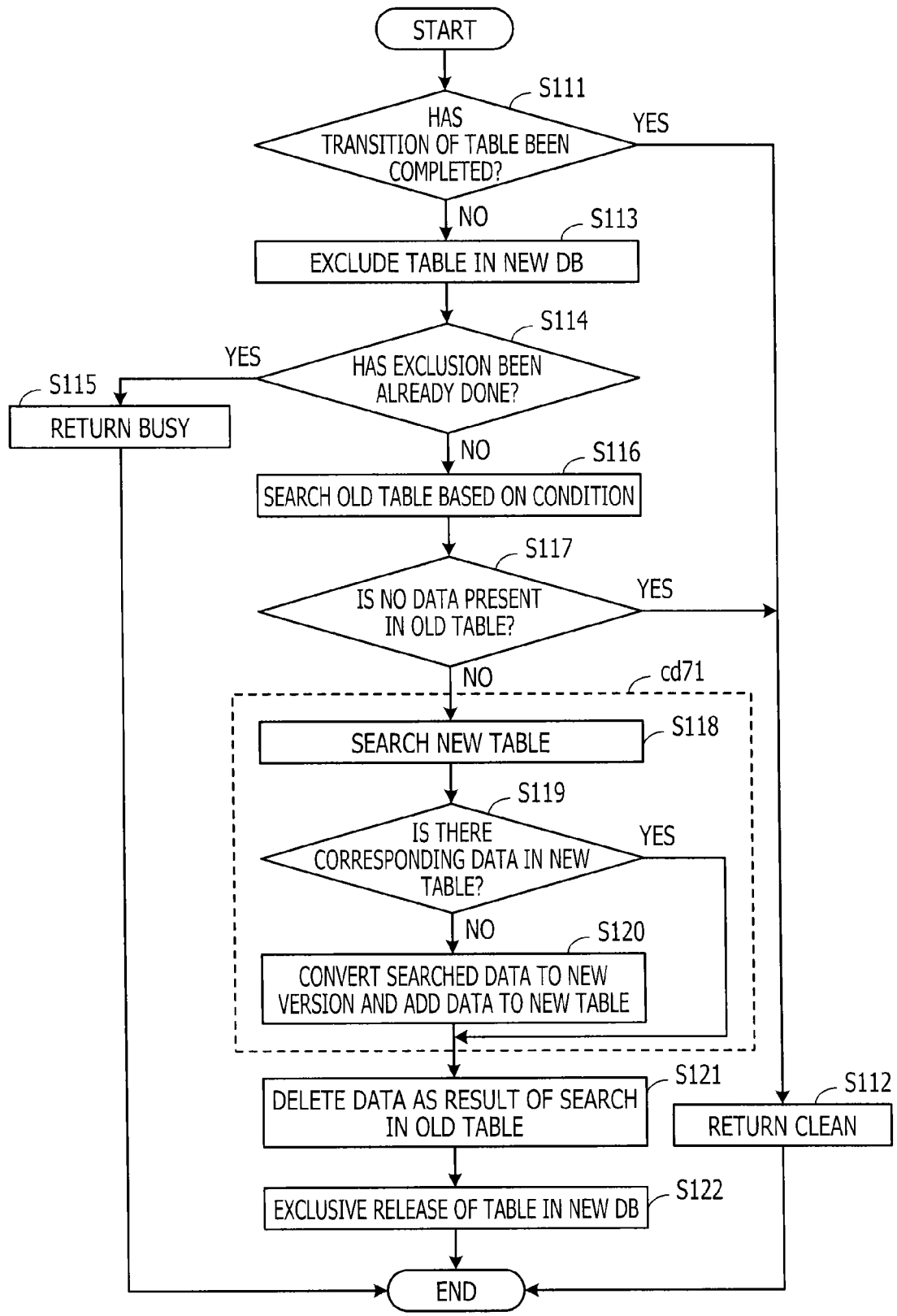
FIG. 25 is an explanatory flowchart of processing of the DB background-updating program illustrated in FIG. 24.

FIG. 25 is an explanatory flowchart of processing performed by the DB background-updating program 212 illustrated in FIG. 24. The processing represented as the code cd71 in FIG. 24 corresponds to Steps S118 to S120 in FIG. 25.

S111: The DB background-updating program 212 determines whether or not transition processing of all the tables from the old database 80-1 to the new database 80-2 has been completed.

S112: In a case in which the transition processing of all the tables has been completed (YES in S111), the DB background-updating program 212 provides information (CLEAN) indicating that the transition processing has been completed, and completes the processing.

S113: In contrast, if the transition has not been completed (NO in S111), the DB background-updating program 212 performs exclusive control of the target table in the new database 80-2. In doing so, accesses to the table in the new database 80-2 by the other programs are not available.

S114: The DB background-updating program 212 determines whether or not the exclusive control of the target table in the new database 80-2 has already been made.

S115: In a case in which the exclusive control of the target table in the new database 80-2 has already been made (YES in S114), this means that another program is using the target table. Therefore, the DB background-updating program 212 provides information indicating that the database 80 is being used (BUSY), and completes the processing. In the case in which the database 80 is being used, the DB background-updating program 212 performs the transition processing at another timing.

S116: In contrast, if the exclusive control of the target table in the new database 80-2 has not been made (NO in S114), the DB background-updating program 212 searches for data in the target table in the old database 80-1.

S117: The DB background-updating program 212 determines whether or not the target table in the old database 80-1 is empty. If there is no data in the target table in the old database 80-1 (YES in S117), the DB background-updating program 212 moves on to the aforementioned Step S112.

S118: In a case in which there is data in the target table in the old database 80-1 (NO in S117), the DB background-updating program 212 further searches for the data, which has been searched in the old database 80-1, in the new database 80-2.

S119: The DB background-updating program 212 determines whether or not the data that has been searched in the old database 80-1 is present in the new database 80-2. That is, the DB background-updating program 212 searches for data that is present in the old database 80-1 while being not present in the new database 80-2.

S120: In a case in which the data that has been searched in the old database 80-1 is not present in the new database 80-2 (NO in S119), this means that the searched data is present only in the old database 80-1. Therefore, the DB background-updating program 212 converts the data that has been searched in the old database 80-1 to have the data configuration in the new database 80-2 and adds the data to the new database 80-2. In a case in which the data that has been searched in the old database 80-1 is also present in the new database 80-2 (YES in S119), the DB background-updating program 212 does not perform the processing in Step S120.

S121: The DB background-updating program 212 deletes the data that has been searched in the old database 80-1 in Step S116 from the old database 80-1. Therefore, the number of data items included in the old database 80-1 becomes zero when transition of all the data items has been completed, for example.

S122: The DB background-updating program 212 performs exclusive release of the target table in the new database 80-2.

As described above with reference to FIG. 24, the DB background-updating program 212 completes the transition processing of all the data items by repeating the processing described above with reference to FIG. 25. If the transition processing is completed, the old database 80-1 becomes empty.

Other Embodiments

The embodiment was described as the example in which the AP servers 20a and 20b were physical servers. However, the embodiment is not limited to the example. The AP servers 20a and 20b may be virtual servers. In addition, the embodiment was described as the example in which the patch was sequentially applied to the application program 210 that operates on the two AP servers 20a an 20b. However, the embodiment is not limited to the example. The DB access program 211-1 for processing during the transition according to the embodiment is also effective for a case in which the patch is sequentially applied to the application program 210 that operates on three or more AP servers 20a and 20b.

As illustrated in FIGS. 7 and 8, the DB background-updating program 212 is introduced only to the AP server 20a with the configuration A in this embodiment. However, the embodiment is not limited to the example. The operator may introduce the DB background-updating program 212 to the AP server 20b with the configuration B as well as the AP server 20a with the configuration A. In addition, the processing of sequentially applying the patch to the application program 210 on the AP server 20a with the configuration A and the AP server 20b with the configuration B is also not limited to the example illustrated in FIGS. 7 and 8. Any configuration is also applicable as long as the DB access program 211-1 for processing during the transition operates while the patch is sequentially applied to the application program 210 that operates on the plurality of AP servers 20a and 20b.

In addition, the examples of the DB access program 211-1 for processing during the transition in accordance with the types of the access request were described with reference to FIGS. 11 to 23. However, the processing performed by the DB access program 211-1 for processing during the transition illustrated in FIGS. 11 to 23 is an example.

For example, a case of receiving an access request for update processing (FIGS. 11 and 12) will be exemplified. In FIGS. 11 and 12, the DB access program 211-1a for processing during the transition determines the database 80-1 or 80-2 in accordance with the version of the application program 210 that has issued the access request if the transition of the target data has not yet been made. In addition, the DB access program 211-1a for processing during the transition determines the new database 80-2 as the database to which the access request is to be transmitted regardless of the version of the application program 210 that has issued the access request if the transition of the target data has already been made.

However, the DB access program 211-1a for processing during the transition may determine the new database 80-2 as the database to which the access request is to be transmitted regardless of the version of the application program 210 that has issued the access request if the transition of the target data has not yet been made.

Similarly, the cases of receiving other types of access request are not limited to the examples of the processing performed by the DB access program 211-1 for processing during the transition as illustrated in FIGS. 11 to 23. The DB access program 211-1 for processing during the transition according to the embodiment determines the target database 80-1 or 80-2 based on the information related to the version of the application program 210 that is included in the access request and the information related to the transition of the target data. In addition, the DB access program 211-1 for processing during the transition according to the embodiment may determine both the databases 80-1 and 80-2.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A method comprising:
    storing, in a database, target data to be accessed by a plurality of information processing apparatus each of which executes a software program that issues a request to access the target data in the database, the request including version information regarding the software program which issued the request and which is being updated from a first version to a second version;
    causing, by a management apparatus configured to control the plurality of information processing apparatuses, each of the plurality of information processing apparatus to update the software program by sequentially updating the software program that operates on each of the plurality of information processing apparatuses;
    updating, by processing circuitry, the database by transferring data from a first database relating to the first version of the software program to a second database relating to the second version of the software program, the first database and the second database being included in the database, the second database having a different data configuration from that of the first database;

receiving, by the processing circuitry, the request from one of the plurality of information processing apparatuses during the updating of the database; and determining, by the processing circuitry, a transmission destination of the received request to one of the first database or the second database, based on the version information included in the received request and a condition of whether or not the target data is transferred from the first database to the second database.

2. The method according to claim 1, further comprising:
sequentially adding, by the processing circuitry, data that is added from the first database to the second database, during the updating of the database.

3. The method according to claim 1, wherein
the request is to update the target data, and
the method further comprises:
   determining, by the processing circuitry, the transmission destination of the received request based on the version information, in a case in which the condition indicates that the target data is only in the first database,
   determining, by the processing circuitry, the second database as the transmission destination of the received request regardless of the information related to the version in a case in which the condition indicates that the target data has been transferred; and
   transferring, by the processing circuitry, the received request to the determined transmission destination.

4. The method according to claim 1, wherein
the request is to write data in the second database, and
the method further comprising:
   converting, by the processing circuitry, the data to data having a data configuration corresponding to the second database, in a case in which the version information that is included in the received request indicates the first version of the software program.

5. The method according to claim 1, wherein
the request is to read the target data in the database, and
the method further comprising:
   converting, by the processing circuitry, data that is read from the second database to data having a configuration corresponding to the first database, in a case in which the version information that is included in the received request indicates the first version of the software program.

6. A system comprising:
a database which stores target data to be accessed by a plurality of information processing apparatus each of which executes a software program that issues a request to access the target data in the database, the request including version information regarding the software program which issued the request and which is being updated from a first version to a second version;
a management apparatus configured to cause each of the plurality of information processing apparatuses to update the software program by sequentially updating the software program that operates on each of the plurality of information processing apparatuses; and
processing circuitry configured to:
   update the database by transferring data from a first database relating to the first version of the software program to a second database relating to the second version of the software program, the first database and the second database being included in the database, the second database having a different data configuration from that of the first database;
   receive the request from one of the plurality of information processing apparatuses during the updating of the database; and
   determine a transmission destination of the received request to one of the first database or the second database, based on the version information included in the received request and a condition of whether or not the target data is transferred from the first database to the second database.

7. The system according to claim 6, wherein the processing circuitry is further configured to:
sequentially add data that is added from the first database to the second database, during the updating of the database.

8. The system according to claim 6, wherein
the request is to update the target data, and
the processing circuitry is further configured to:
determine the transmission destination of the received request based on the version information, in a case in which the condition indicates that the target data is only in the first database,
determine the second database as the transmission destination of the received request regardless of the information related to the version in a case in which the condition indicates that the target data has been transferred; and
transfer the received request to the determined transmission destination.

9. The system according to claim 6, wherein
the request is to write data in the database, and
the processing circuitry is further configured to convert the data to data having a data configuration corresponding to the second database, in a case in which the version information that is included in the received request indicates the first version of the software program.

10. The system according to claim 6, wherein
the request is to read the target data in the database, and
the processing circuitry is further configured to convert data that is read from the second database to data having a configuration corresponding to the first database, in a case in which the version information that is included in the received request indicates the first version of the software program.

11. A non-transitory computer readable medium having stored therein a program that causes circuitry to execute a process, the process comprising:
storing target data in a database to be accessed by a plurality of information processing apparatus each of which executes a software program that issues a request to access the target data, the request including version information regarding the software program which issued the request and which is being updated from a first version to a second version;
causing each of the plurality of information processing apparatus to update the software program by sequentially updating the software program that operates on each of the plurality of information processing apparatuses;
updating the database by transferring data from a first database relating to the first version of the software program to a second database relating to the second version of the software program, the first database and the second database being included in the database, the second database having a different data configuration from that of the first database;

receiving the request from one of the plurality of information processing apparatuses during the updating of the database; and determining a transmission destination of the received request to one of the first database or the second database, based on the version information included in the received request and a condition of whether or not the target data is transferred from the first database to the second database.

\* \* \* \* \*